US012699403B2

(12) United States Patent
Liu et al.

(10) Patent No.: US 12,699,403 B2
(45) Date of Patent: Aug. 4, 2026

(54) FLOOR MATERIAL RECOGNITION METHOD, CONTROL METHOD, AND STORAGE MEDIUM

(71) Applicant: Qfeeltech (Beijing) Co., Ltd., Beijing (CN)

(72) Inventors: Zhanglin Liu, Beijing (CN); Wulin Tian, Beijing (CN)

(73) Assignee: Qfeeltech (Beijing) Co., Ltd., Beijing (CN)

( * ) Notice: Subject to any disclaimer, the term of this patent is extended or adjusted under 35 U.S.C. 154(b) by 281 days.

(21) Appl. No.: 18/411,014

(22) Filed: Jan. 11, 2024

(65) Prior Publication Data

US 2024/0210960 A1 Jun. 27, 2024

Related U.S. Application Data

(63) Continuation of application No. PCT/CN2022/092611, filed on May 13, 2022.

(30) Foreign Application Priority Data

Jul. 16, 2021 (CN) .......................... 202110806534.3

(51) Int. Cl.
*G05D 1/648* (2024.01)
*A47L 11/28* (2006.01)
(Continued)

(52) U.S. Cl.
CPC ............ *G05D 1/6485* (2024.01); *A47L 11/28* (2013.01); *A47L 11/4011* (2013.01);
(Continued)

(58) Field of Classification Search
CPC .. A47L 11/28; A47L 11/4011; A47L 11/4061; A47L 11/4066; A47L 2201/04;
(Continued)

(56) References Cited

U.S. PATENT DOCUMENTS

| | | | |
|---|---|---|---|
| 8,271,133 B2 | 9/2012 | Park et al. | |
| 8,782,848 B2 | 7/2014 | Ziegler et al. | |

(Continued)

FOREIGN PATENT DOCUMENTS

| | | |
|---|---|---|
| CN | 104302453 B | 7/2016 |
| CN | 105717924 B | 12/2018 |

(Continued)

OTHER PUBLICATIONS

Machine translation of CN111060129A (Year: 2020).*

(Continued)

*Primary Examiner* — Douglas Lee
(74) *Attorney, Agent, or Firm* — Alleman Hall LLP

(57) ABSTRACT

The present disclosure relates to the technical field of smart home, and in particular, to a floor material recognition method, a control method, and a storage medium. The recognition method for the autonomous mobile device for recognizing the floor material includes: transmitting control instructions to the autonomous mobile device, the control instructions including commands that instruct the autonomous mobile device to rotate at a same location for a predetermined rotation angle; obtaining an actual rotation angle of the autonomous mobile device; determining a floor material based on the predetermined rotation angle and the actual rotation angle, such that the autonomous mobile device can automatically recognize different floor materials, and execute different functions or work modes, or automatically configure different set velocities based on the different floor materials, such that the autonomous mobile device can reach substantially consistent actual moving velocities when moving on the different floor materials.

16 Claims, 12 Drawing Sheets

(51) Int. Cl.
    *A47L 11/40*         (2006.01)
    *G05D 105/10*      (2024.01)

(52) U.S. Cl.
    CPC ....... *A47L 2201/04* (2013.01); *A47L 2201/06*
        (2013.01); *G05D 2105/10* (2024.01)

(58) Field of Classification Search
    CPC . A47L 2201/06; A47L 9/2826; G05D 1/6485;
        G05D 1/65; G05D 2105/10; G05D
        2107/40; G05D 2109/10; G05D 2111/56
    See application file for complete search history.

(56)             References Cited

U.S. PATENT DOCUMENTS

| | | |
|---|---|---|
| 9,223,312 B2 | 12/2015 | Goel et al. |
| 9,969,089 B2 | 5/2018 | Goel et al. |
| 10,694,908 B2 | 6/2020 | Yan |
| 2020/0031226 A1 | 1/2020 | Haegermarck et al. |
| 2020/0154963 A1 | 5/2020 | Kuhe et al. |
| 2021/0038032 A1 | 2/2021 | Brown |
| 2022/0047141 A1* | 2/2022 | Xu ...................... A47L 11/4055 |

FOREIGN PATENT DOCUMENTS

| | | | |
|---|---|---|---|
| CN | 109202891 A | 1/2019 | |
| CN | 110366381 A | 10/2019 | |
| CN | 107024928 B | 4/2020 | |
| CN | 111053498 A | 4/2020 | |
| CN | 111060129 A * | 4/2020 | .............. G01V 9/00 |
| CN | 112603204 A | 4/2021 | |
| JP | H11102220 A * | 4/1999 | |
| JP | 2005160958 A | 6/2005 | |

OTHER PUBLICATIONS

Machine translation of JPH11-102220A (Year: 1999).*
International Search Report and Written Opinion dated Jul. 25, 2022, issued in PCT/CN2022/092611, filed on May 13, 2022, and their English machine translations (11 pages).

* cited by examiner

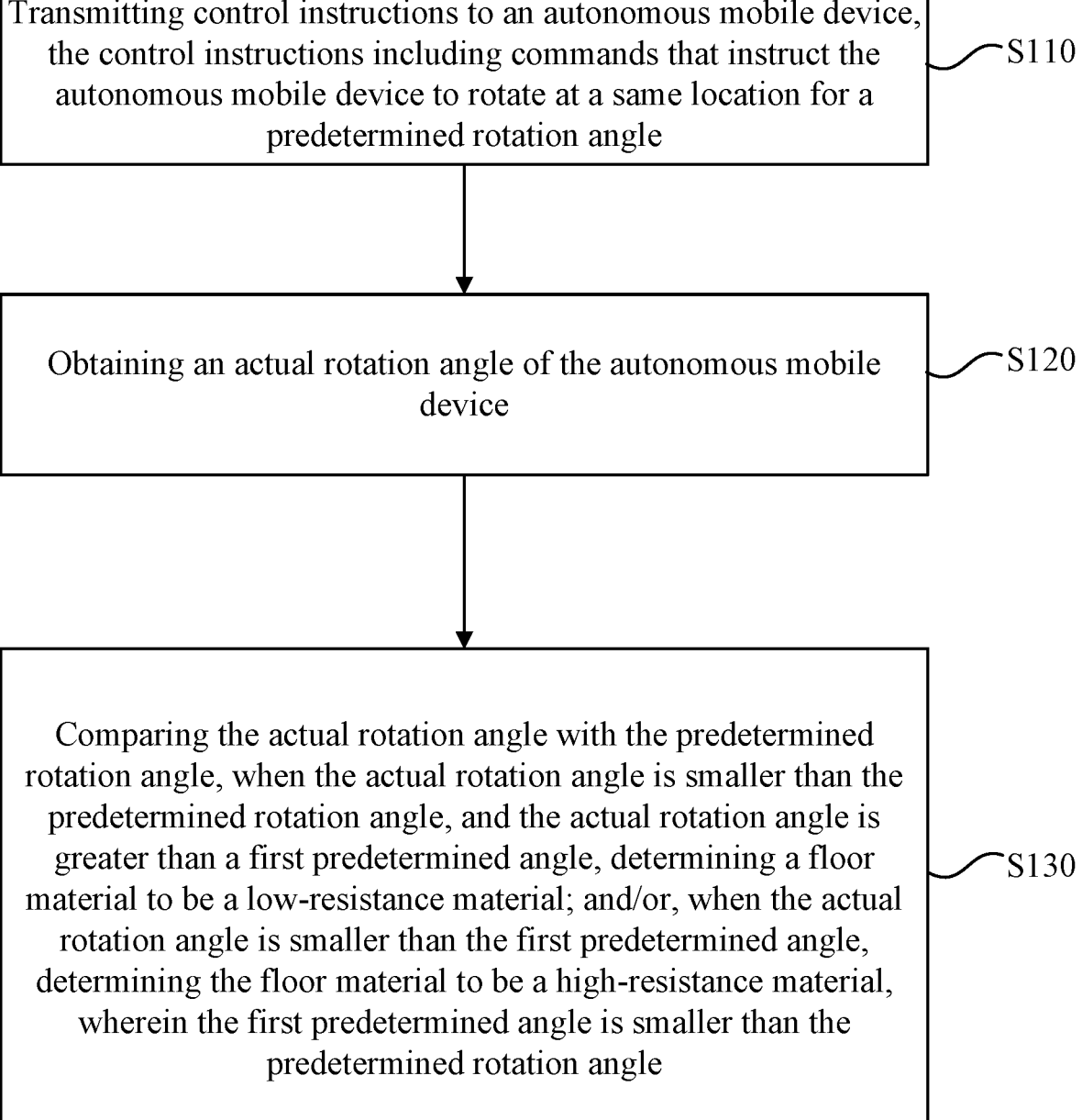

Transmitting control instructions to an autonomous mobile device, the control instructions including commands that instruct the autonomous mobile device to rotate at a same location for a predetermined rotation angle ⟋S110

Obtaining an actual rotation angle of the autonomous mobile device ⟋S120

Comparing the actual rotation angle with the predetermined rotation angle, when the actual rotation angle is smaller than the predetermined rotation angle, and the actual rotation angle is greater than a first predetermined angle, determining a floor material to be a low-resistance material; and/or, when the actual rotation angle is smaller than the first predetermined angle, determining the floor material to be a high-resistance material, wherein the first predetermined angle is smaller than the predetermined rotation angle ⟋S130

FIG. 1

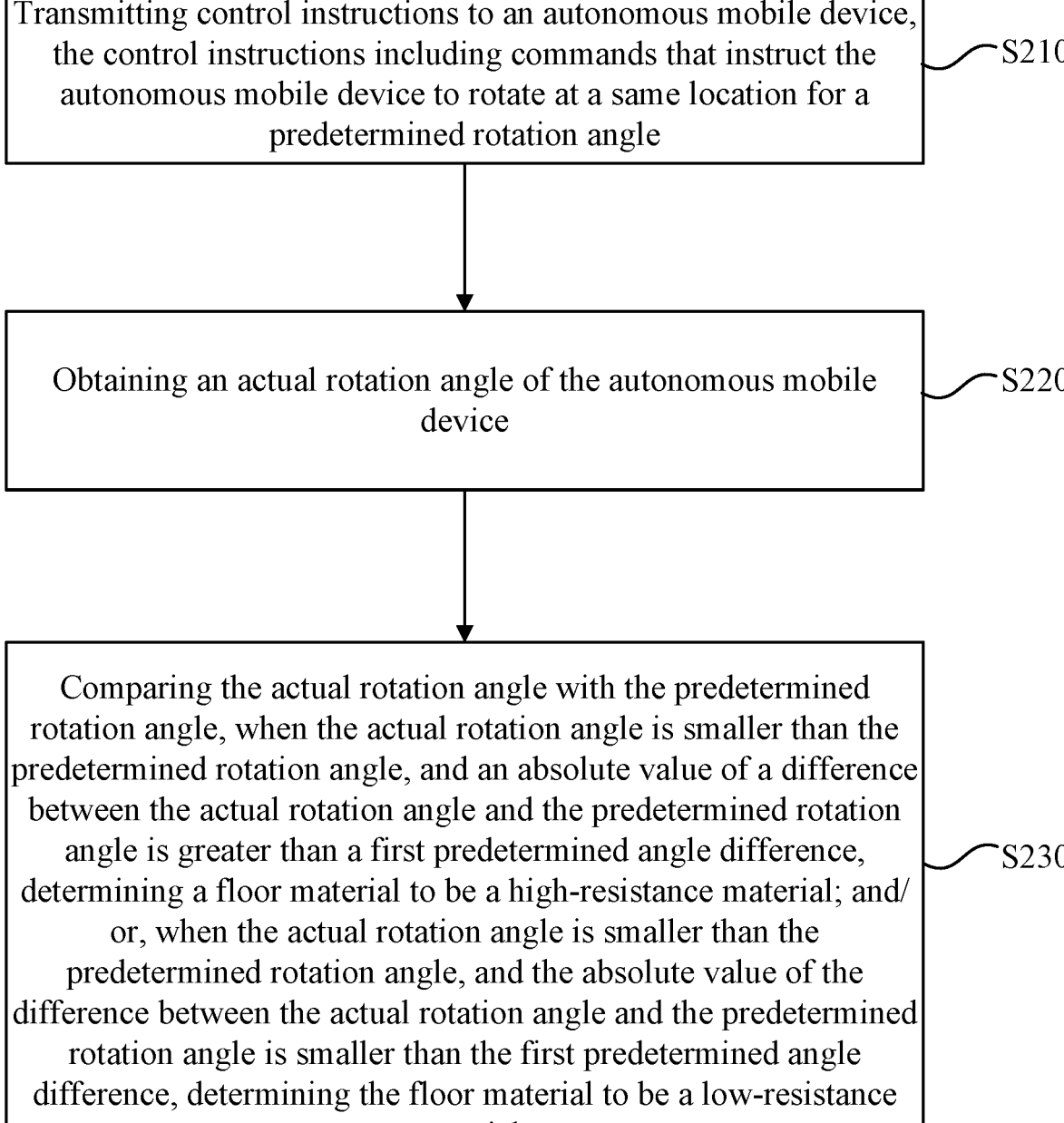

Transmitting control instructions to an autonomous mobile device, the control instructions including commands that instruct the autonomous mobile device to rotate at a same location for a predetermined rotation angle — S210

Obtaining an actual rotation angle of the autonomous mobile device — S220

Comparing the actual rotation angle with the predetermined rotation angle, when the actual rotation angle is smaller than the predetermined rotation angle, and an absolute value of a difference between the actual rotation angle and the predetermined rotation angle is greater than a first predetermined angle difference, determining a floor material to be a high-resistance material; and/ or, when the actual rotation angle is smaller than the predetermined rotation angle, and the absolute value of the difference between the actual rotation angle and the predetermined rotation angle is smaller than the first predetermined angle difference, determining the floor material to be a low-resistance material — S230

FIG. 4

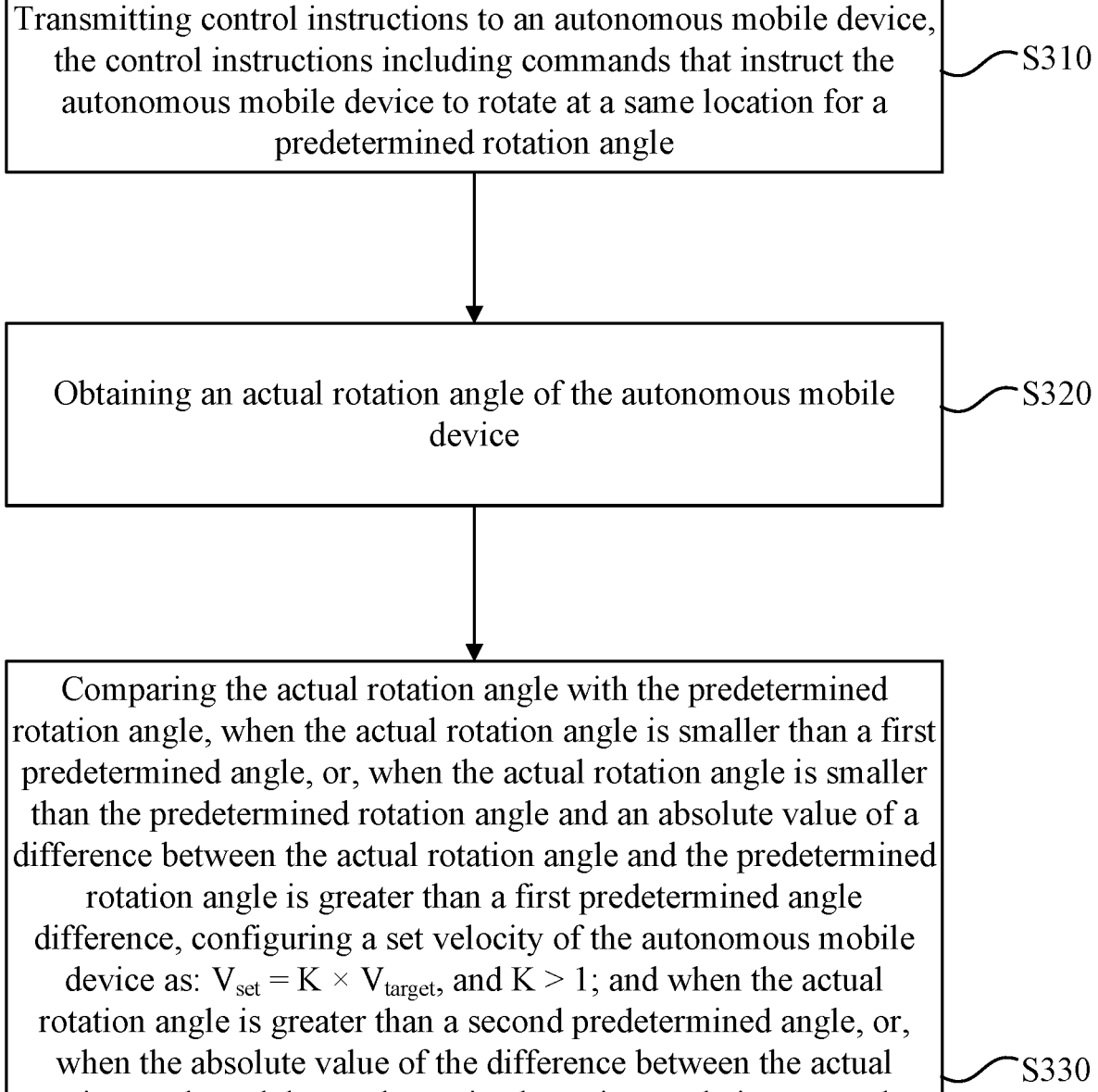

Transmitting control instructions to an autonomous mobile device, the control instructions including commands that instruct the autonomous mobile device to rotate at a same location for a predetermined rotation angle ⌐S310

Obtaining an actual rotation angle of the autonomous mobile device ⌐S320

Comparing the actual rotation angle with the predetermined rotation angle, when the actual rotation angle is smaller than a first predetermined angle, or, when the actual rotation angle is smaller than the predetermined rotation angle and an absolute value of a difference between the actual rotation angle and the predetermined rotation angle is greater than a first predetermined angle difference, configuring a set velocity of the autonomous mobile device as: $V_{set} = K \times V_{target}$, and $K > 1$; and when the actual rotation angle is greater than a second predetermined angle, or, when the absolute value of the difference between the actual rotation angle and the predetermined rotation angle is greater than the first predetermined angle difference and smaller than a second predetermined angle difference, then, $K = A \times (\alpha - \beta)$; when the actual rotation angle is smaller than the second predetermined angle, or, when the absolute value of the difference between the actual rotation angle and the predetermined rotation angle is greater than the second predetermined angle difference, then, $K = A \times \Delta2$. ⌐S330

FIG. 7

FLOOR MATERIAL RECOGNITION METHOD, CONTROL METHOD, AND STORAGE MEDIUM

CROSS-REFERENCE TO RELATED APPLICATION

This application is a continuation of International Application No. PCT/CN2022/092611, filed on May 13, 2022, which claims priority to Chinese Patent Application No. 202110806534.3, filed on Jul. 16, 2021, titled "Floor Material Recognition Method, Control Method, Apparatus and Storage Medium." The contents of the above-referenced applications are incorporated herein by reference in their entirety in this application.

TECHNICAL FIELD

The present disclosure relates to the technical field of smart homes and, in particular, to a floor material recognition method, a control method, an apparatus, and a storage medium.

BACKGROUND

An autonomous mobile device is a smart device that autonomously executes predetermined tasks in a predetermined zone. Currently available autonomous mobile devices typically include, but are not limited to, cleaning robots (e.g., smart floor sweeping robots, smart floor mopping robots, window cleaning robots), companion type mobile robots (e.g., smart electronic pets, nanny robots), service type mobile robots (e.g., receptionist robots in restaurants, hotels, meeting places), industrial inspection smart devices (e.g., electric power line inspection robots, smart forklift, etc.), security robots (e.g., home or commercial use smart bodyguard robots), etc. These service type robots have advantages of time-saving and energy-saving, and are convenient to operate. As a result, people are free from tedious labor, and can have more time for rest and entertainment, thereby enhancing the comfort of people's daily lives.

However, while the existing autonomous mobile devices can provide convenience to people, there are some issues associated with the existing autonomous mobile devices. For example, nowadays, the indoor floors may be made of different floor materials. Some may be wood floors, some may be marble or porcelain floors. Some may be covered with hard or soft carpet, or long-fiber or short-fiber carpet. Some may be made of a hybrid of multiple floor materials. Different floor materials may provide different resistances to a motion unit (e.g., a wheel assembly) of the autonomous mobile device, which may affect the moving velocity of the autonomous mobile device, and may cause computation errors in sensors that measure motion parameters such as an encoder wheel, a gyroscope, an accelerometer, etc. As a result, the measured displacement, angle, linear velocity, angular velocity, acceleration may have relatively large errors from actual values. This may render the autonomous mobile device unable to arrive at a predetermined location following predetermined instructions. Consequently, the work efficiency of the autonomous mobile device may be affected, and the accuracy of the localization, mapping, and navigation functions while the autonomous mobile device operate in an indoor space may be affected.

SUMMARY OF DISCLOSURE

In view of the above, embodiments of the present disclosure provide a floor material recognition method, a control method, an apparatus, and a storage medium, in order to address the issues in the existing technology relating to the low work efficiency caused by different moving velocity of the autonomous mobile device due to floor materials having different resistance.

Embodiments of the present disclosure provide a floor material recognition method for an autonomous mobile device, including: transmitting control instructions to the autonomous mobile device, the control instructions including commands instructing the autonomous mobile device to rotate at the same location (e.g., spin in place, or rotate in place) for a predetermined rotation angle; obtaining an actual rotation angle of the autonomous mobile device; comparing the actual rotation angle with the predetermined rotation angle; when the actual rotation angle is smaller than the predetermined rotation angle, and the actual rotation angle is greater than a first predetermined angle, determining that a floor material is a low-resistance material; when the actual rotation angle is smaller than the first predetermined angle, determining that the floor material is a high-resistance material; wherein, the first predetermined angle is smaller than the predetermined rotation angle.

Embodiments of the present disclosure also provide a floor material recognition method for an autonomous mobile device, including: transmitting control instructions to the autonomous mobile device, the control instructions including commands instructing the autonomous mobile device to rotate at the same location for a predetermined rotation angle; obtaining an actual rotation angle of the autonomous mobile device; comparing the actual rotation angle with the predetermined rotation angle, when the actual rotation angle is smaller than the predetermined rotation angle, and an absolute value of a difference between the actual rotation angle and the predetermined rotation angle is greater than a first predetermined angle difference, determining that a floor material is a high-resistance material; when the actual rotation angle is smaller than the predetermined rotation angle, and the absolute value of the difference between the actual rotation angle and the predetermined rotation angle is smaller than the first predetermined angle difference, determining that the floor material is a low-resistance material.

In some embodiments, the floor material recognition method also includes: when the floor material is a high-resistance material, configuring a set velocity of the autonomous mobile device to be: $V_{set}=K\times V_{target}$; wherein, $V_{set}$ is the set velocity, $V_{target}$ is a target velocity, K is a coefficient, and K>1; in addition, when the actual rotation angle is greater than a second predetermined angle, or, the absolute value of the difference between the actual rotation angle and the predetermined rotation angle is greater than the first predetermined angle difference and smaller than a second predetermined angle difference, then $K=A\times(\alpha-\beta)$, $\alpha$ is the predetermined rotation angle, $\beta$ is the actual rotation angle, A is a constant; or, when the actual rotation angle is smaller than the second predetermined angle, or, when the absolute value of the difference between the actual rotation angle and the predetermined rotation angle is greater than the second predetermined angle difference, then $K=A\times\Delta2$, where, $\Delta2$ is the second predetermined angle difference, A is a constant, wherein, the second predetermined angle is smaller than the first predetermined angle, the second predetermined angle difference is greater than the first predetermined angle difference. The target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

In some embodiments, the floor material recognition method also includes: when it is determined that the floor material is a high-resistance material, increasing a work power of the autonomous mobile device and/or setting a work mode to be a high power mode; and/or, when it is determined that the floor material is a low-resistance material, maintaining the work power of the autonomous mobile device and/or setting the work mode to be a normal or quiet work mode.

Embodiments of the present disclosure also provide a control method for controlling a moving velocity of an autonomous mobile device, including: transmitting control instructions to the autonomous mobile device, the control instructions including commands that instruct the autonomous mobile device to rotate at the same location for a predetermined rotation angle; obtaining an actual rotation angle of the autonomous mobile device; comparing the actual rotation angle with the predetermined rotation angle, when the actual rotation angle is smaller than a first predetermined angle, or, when the actual rotation angle is smaller than the predetermined rotation angle and an absolute value of a difference between the actual rotation angle and the predetermined rotation angle is greater than a first predetermined angle difference, configuring a set velocity of the autonomous mobile device to be: $V_{set} = K \times V_{target}$; wherein, $V_{set}$ is the set velocity, $V_{target}$ is a target velocity, K is a coefficient, and K>1. The target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity. In addition, when the actual rotation angle is greater than a second predetermined angle, or, the absolute value of the difference between the actual rotation angle and the predetermined rotation angle is greater than the first predetermined angle difference and smaller than a second predetermined angle difference, then $K = A \times (\alpha - \beta)$, $\alpha$ is the predetermined rotation angle, $\beta$ is the actual rotation angle, A is a constant. When the actual rotation angle is smaller than the second predetermined angle, or, when the absolute value of the difference between the actual rotation angle and the predetermined rotation angle is greater than the second predetermined angle difference, then $K = A \times \Delta 2$, where, $\Delta 2$ is the second predetermined angle difference, A is a constant, wherein, the first predetermined angle is smaller than the predetermined rotation angle, the second predetermined rotation angle is smaller than the first predetermined angle, the second predetermined angle difference is greater than the first predetermined angle difference. The control method also includes: controlling the autonomous mobile device to move on the floor at the target velocity.

Embodiments of the present disclosure also provide a recognition apparatus for an autonomous mobile device to recognize a floor material, including: a command device configured to transmit control instructions to the autonomous mobile device, the control instructions include commands that instruct the autonomous mobile device to rotate at the same location for a predetermined rotation angle;
    an obtaining device configured to obtain an actual rotation angle of the autonomous mobile device;
    a determining device configured to compare the actual rotation angle with the predetermined rotation angle;

when the actual rotation angle is smaller than the predetermined rotation angle, and the actual rotation angle is greater than a first predetermined angle, determining that the floor material is a low-resistance material; when the actual rotation angle is smaller than the first predetermined angle, determining that the floor material is a high-resistance material, wherein the first predetermined angle is smaller than the predetermined rotation angle.

Embodiments of the present disclosure also provide a recognition apparatus for the autonomous mobile device to recognize a floor material, including: a command device configured to transmit control instructions to the autonomous mobile device, the control instructions include commands that instruct the autonomous mobile device to rotate at the same location for a predetermined rotation angle;
    an obtaining device configured to obtain an actual rotation angle of the autonomous mobile device;
    a determining device configured to compare the actual rotation angle with the predetermined rotation angle; when the actual rotation angle is smaller than the predetermined rotation angle, and an absolute value of a difference between the actual rotation angle and the predetermined rotation angle is greater than a first predetermined angle difference, determining that the floor material is a high-resistance material; when the actual rotation angle is smaller than the predetermined rotation angle, and the absolute value of the difference between the actual rotation angle and the predetermined rotation angle is smaller than the first predetermined angle difference, determining that the floor material is a low-resistance material.

In some embodiments, the recognition apparatus also includes: a first control device configured to, when the floor material is a high-resistance material, configure the set velocity of the autonomous mobile device to be: $V_{set} = K \times V_{target}$; wherein, $V_{set}$ is the set velocity, $V_{target}$ is a target velocity, K is a coefficient, and K>1. When the actual rotation angle is greater than a second predetermined angle, or, the absolute value of the difference between the actual rotation angle and the predetermined rotation angle is greater than the first predetermined angle difference and smaller than a second predetermined angle difference, then $K = A \times (\alpha - \beta)$, $\alpha$ is the predetermined rotation angle, $\beta$ is the actual rotation angle, A is a constant. When the actual rotation angle is smaller than the second predetermined angle, or, when the absolute value of the difference between the actual rotation angle and the predetermined rotation angle is greater than the second predetermined angle difference, then $K = A \times \Delta 2$, where, $\Delta 2$ is the second predetermined angle difference, A is a constant, wherein, the second predetermined rotation angle is smaller than the first predetermined angle, the second predetermined angle difference is greater than the first predetermined angle difference. The target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

Embodiments of the present disclosure also provide a control apparatus for controlling a moving velocity of an autonomous mobile device, including: a command device configured to transmit instructions to the autonomous mobile device, the control instructions including commands that instruct the autonomous mobile device to rotate at the same location for a predetermined rotation angle;

an obtaining device configured to obtain an actual rotation angle of the autonomous mobile device;

a first control device configured to: compare the actual rotation angle with the predetermined rotation angle; when the actual rotation angle is smaller than a first predetermined angle, or, when the actual rotation angle is smaller than the predetermined rotation angle and an absolute value of a difference between the actual rotation angle and the predetermined rotation angle is greater than a first predetermined angle difference, configure a set velocity of the autonomous mobile device to be: $V_{set}=K\times V_{target}$; wherein, $V_{set}$ is the set velocity, $V_{target}$ is a target velocity, K is a coefficient, and K>1; the target velocity is a moving velocity for the autonomous mobile device to reach when moving on the floor as required by the control instructions; the set velocity is a velocity for the motion assembly of the autonomous mobile device to reach, as required by the control instructions, in order for the autonomous mobile device to reach the target velocity; when the actual rotation angle is greater than a second predetermined angle, or, the absolute value of the difference between the actual rotation angle and the predetermined rotation angle is greater than the first predetermined angle difference and smaller than a second predetermined angle difference, then $K=A\times(\alpha-\beta)$, $\alpha$ is the predetermined rotation angle, $\beta$ is the actual rotation angle, A is a constant; when the actual rotation angle is smaller than the second predetermined angle, or, when the absolute value of the difference between the actual rotation angle and the predetermined rotation angle is greater than the second predetermined angle difference, then $K=A\times\Delta 2$, where, $\Delta 2$ is the second predetermined angle difference, A is a constant, wherein, the first predetermined angle is smaller than the predetermined rotation angle, the second predetermined rotation angle is smaller than the first predetermined angle, the second predetermined angle difference is greater than the first predetermined angle difference;

a second control device configured to control the autonomous mobile device to move on a floor at the target velocity.

Embodiments of the present disclosure also provide a non-transitory computer-readable storage medium storing a computer program. When the computer program is executed by a computer or a processor, the floor material recognition method for the autonomous mobile device, or the control method for controlling the moving velocity of the autonomous mobile device may be performed.

Embodiments of the present disclosure provide a floor material recognition method, an apparatus, and a storage medium. The present disclosure provides a recognition method for automatically recognizing a material of a floor where the autonomous mobile device is located through the difference between the actual rotation angle and the predetermined rotation angle, as well as an apparatus, and a storage medium. As such, the autonomous mobile device can recognize different floor materials, and can execute different functions or operate in different work modes based on the different floor materials. As a result, the adaptability of the autonomous mobile device to the environment and the intelligent level can be enhanced. In some embodiments, for different floor materials, different set velocity may be automatically configured, such that no matter what material the floor is made of, the autonomous mobile device can move on the floor at a substantially consistent actual moving velocity, thereby ensuring the work efficiency of the autonomous mobile device.

Embodiments of the present disclosure provide a control method for controlling a moving velocity of the autonomous mobile device, an apparatus, and a storage medium. A set velocity of the autonomous mobile device may be determined based on a difference between the predetermined rotation angle and the actual rotation angle, such that no matter what material the floor is made of, the autonomous mobile device can move on the floor at a substantially consistent actual moving velocity, thereby ensuring the work efficiency of the autonomous mobile device.

BRIEF DESCRIPTION OF THE DRAWINGS

To explain more clearly the technical solutions of the present disclosure or of the existing technologies, the accompanying drawings that are used in the description of the embodiments or the existing technologies are briefly introduced. Obviously, the accompanying drawings described below show some embodiments of the present disclosure. For a person having ordinary skills in the art, other accompanying drawings may be obtained based on these accompanying drawings without expending creative effort.

FIG. 1 is a first schematic illustration of a floor material recognition method for an autonomous mobile device, according to an embodiment of the present disclosure;

FIG. 4 is a second schematic illustration of a floor material recognition method for the autonomous mobile device, according to an embodiment of the present disclosure;

FIG. 7 is a schematic illustration of a control method for controlling a moving velocity of the autonomous mobile device, according to an embodiment of the present disclosure;

DETAILED DESCRIPTION

Figure 2:
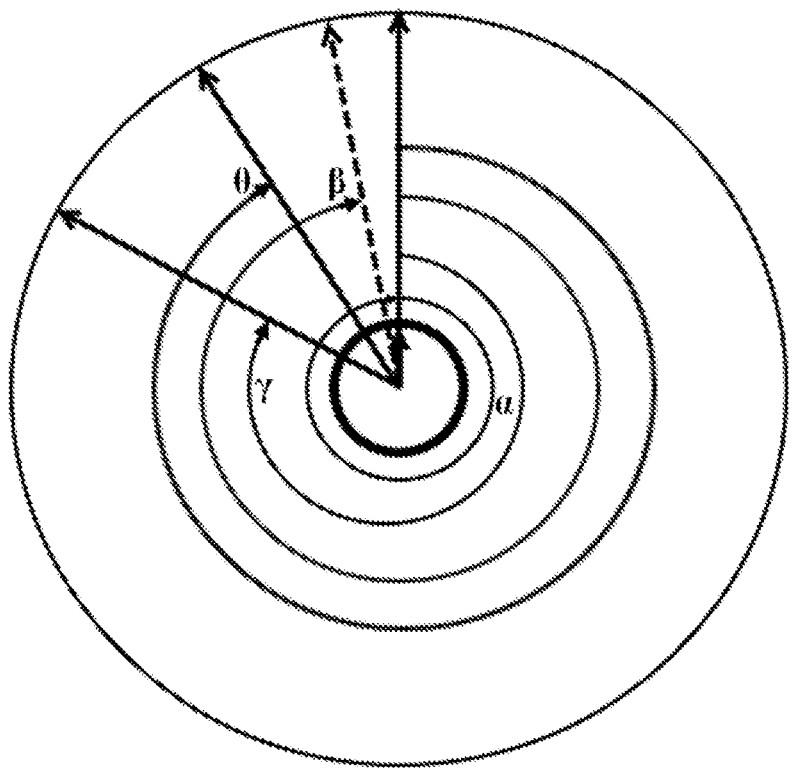
FIG. 2 is a schematic illustration of an actual rotation angle $\beta$ of the autonomous mobile device being smaller than a predetermined rotation angle $\alpha$, and the actual rotation angle $\beta$ being greater than a first predetermined angle $\theta$, according to an embodiment of the present disclosure.

First, a person having ordinary skills in the art could appreciate, that these embodiments are only used to explain the technical principles of the present disclosure, and are not used to limit the protection scope of the present disclosure. A person having ordinary skills in the art can adjust the embodiments based on need, so as to adapt to specific application scenes.

Second, it should be noted that, in the descriptions of the present disclosure, terms indicating direction or positional relationship, such as "inner," "outer," are based on the direction or positional relationship shown in the accompanying drawings. These terms are only used for the convenience of descriptions, and are not for indicating or implying relevant apparatus or component necessarily has the specific orientation, is constructed or operated based on the specific orientation, and hence should not be interpreted as limiting the scope of the present disclosure.

In addition, it should be noted that, in the descriptions of the present disclosure, unless otherwise expressly defined or limited, terms such as "connected," "coupled," should be interpreted broadly. For example, a connection or coupling may be a fixed connection or coupling, or may be a detachable connection or coupling, or two components may be integrated as a single component. The connection or coupling may be a mechanical connection or coupling, or may be an electrical connection or coupling. The connection or coupling may be direct connection or coupling, or may be indirect connection or coupling through an intermediate medium. The connection or coupling may be connection or coupling of internal portions of two components. For a person having ordinary skills in the art, the specific meaning of the above terms in the embodiments of the present disclosure may be understood based on specific context.

In order for the objective, technical solutions, and advantages of the present disclosure to become clearer, next, with reference to the accompanying drawings of the embodiments of the present disclosure, the technical solutions of the embodiments of the present disclosure will be described clearly and comprehensively. The described embodiments are only some embodiments of the present disclosure, and are not all of the embodiments of the present disclosure. Based on the embodiments of the present disclosure, a person having ordinary skills in the art can obtain other embodiments without spending creative efforts. Such embodiments also fall into the protection scope of the present disclosure.

Autonomous mobile devices include transportation robots, smart floor sweeping robots, etc. An autonomous mobile device typically moves along predetermined routes to complete predetermined tasks. For example, a transportation robot can move cargo along a predetermined route. That is, the transportation robot can move to a starting location of the predetermined route and can load cargo, and then transport the cargo along the predetermined route to an unloading location. For example, the transportation robot may be a logistics robot or an automated guided vehicle (AGV) forklift. A smart floor sweeping robot can move on a floor along a predetermined route. During the movement, a vacuum cleaner disposed at the bottom of the smart floor sweeping robot can suction trash on the floor into a dust container, thereby accomplishing the floor cleaning function. The smart floor sweeping robot can also move to a charging base along a predetermined route. The smart floor sweeping robot may be stored at the charging base and may perform battery charging.

However, during the operation of the autonomous mobile device, the autonomous mobile device may move on different types of floors. In other words, the different types of floors on which the autonomous mobile device moves may provide different resistance to the autonomous mobile device. For example, hard floors (e.g., wood floors, porcelain floors, granite floors) and carpets may provide different resistance to the autonomous mobile device. Even for carpets, depending on the fiber types, the carpets may have long fibers, short fibers, hard fibers, soft fibers, dense fibers, loose fibers, etc. Carpets with different fibers may provide different resistance. When the set velocity is the same, the actual moving velocity of the autonomous mobile device may be different when the autonomous mobile device moves on different types of floors having different resistances. The set velocity in this disclosure means a velocity (which may be an average velocity) to be reached by a motion assembly (e.g., a wheel assembly) of the autonomous mobile device, as included in the control instructions transmitted to the autonomous mobile device, the purpose of the set velocity is for the autonomous mobile device to reach a target velocity when the autonomous mobile device moves on a corresponding floor. For example, the set velocity may be 1.5 rounds/second. Assuming the circumference of the wheel assembly is 0.2 meters, because the autonomous mobile device measures its actual moving distance on the floor through rotation of the motion assembly, the above set velocity may be expressed as: 0.2 meters×1.5 rounds/second=0.3 meters/second (m/s). In other words, the control instructions command the wheel assembly of the autonomous mobile device to reach a set velocity of 0.3 m/s. Typically, the set velocity is proportional to an output power of an electric motor. That is, the larger the output power, the larger the set velocity. The control instructions may control the output power, thereby controlling the set velocity. When no slippage occurs to the wheel assembly, for example, when the autonomous mobile device moves on a low-resistance floor such as a wood floor, a granite floor or a porcelain floor, the set velocity may be equal to the actual moving velocity of the autonomous mobile device on the floor. Therefore, the set velocity of the autonomous mobile device moving on the low-resistance floor may be used as the target velocity. The target velocity in the present disclosure refers to a moving velocity to be reached by the autonomous mobile device when moving on the floor as required by the control instructions. Because when the autonomous mobile device moves on a high-resistance floor (e.g., a carpet, etc.), the wheel assembly of the autonomous mobile device may sink in the carpet, causing the wheel assembly to slip (i.e., the rounds of rotation of the wheel assembly is inconsistent with the actual moving distance of the autonomous mobile device). For a long-fiber carpet, the fiber may hinder the movement of the chassis of the autonomous mobile device to some extent. The combination of the above factors may affect the actual moving velocity of the autonomous mobile device on the carpet, causing inconsistency between the set velocity and the actual moving velocity. That is, under a same set velocity (which may be understood as under a same output power), the actual moving velocity of the autonomous mobile device on the carpet may be smaller than the set velocity, which reduces the work efficiency, causing the autonomous mobile device to be unable to complete work tasks according to an original plan. To make the actual moving velocity of the autonomous mobile device on the floor to reach the target velocity, the control instructions may command the motion assembly (e.g., the wheel assembly or a track) to reach the set velocity, such that the actual moving velocity of the autonomous mobile device on the specific type of floor reaches the target velocity. Based on the above descriptions, the set velocity on a high-resistance floor is typically greater than the target velocity.

Embodiments of the present disclosure provide a floor material recognition method, an apparatus, and a storage medium. The present disclosure provides a recognition method for automatically recognizing a material of a floor where the autonomous mobile device is located through the difference between the actual rotation angle and the predetermined rotation angle, as well as an apparatus. As such, the autonomous mobile device can recognize different floor materials, and can execute different functions or operate in different work modes based on the different floor materials. As a result, the adaptability of the autonomous mobile device to the environment and the intelligent level can be enhanced. In some embodiments, for different floor materials, different set velocity may be automatically configured, such that no matter what material the floor is made of, the autonomous mobile device can move on the floor at a substantially consistent actual moving velocity, thereby ensuring the work efficiency of the autonomous mobile device.

Embodiments of the present disclosure provide a control method for controlling a moving velocity of the autonomous mobile device, an apparatus, and a storage medium. A set velocity of the autonomous mobile device may be determined based on a difference between the predetermined rotation angle and the actual rotation angle, such that no matter what material the floor is made of, the autonomous mobile device can move on the floor at a substantially consistent actual moving velocity, thereby ensuring the work efficiency of the autonomous mobile device.

It should be noted that that the technical solutions of the embodiments of the present disclosure can be applied to various types of autonomous mobile devices, such as: smart floor sweeping robots, transportation robots, medical robots, disability service robots. An autonomous mobile device includes a main body, a motion assembly disposed at a bottom portion of the main body. The motion assembly includes a wheel assembly or a track. The motion assembly is configured to cause the main body to move and rotate.

FIG. 1 illustrates a floor material recognition method 100 for an autonomous mobile device, according to an embodiment of the present disclosure. The recognition method 100 may include:

S110, transmitting control instructions to the autonomous mobile device, the control instructions including commands that instruct the autonomous mobile device to rotate at a same location (i.e., spin in place, rotate in place) for a predetermined rotation angle.

Figure 3:
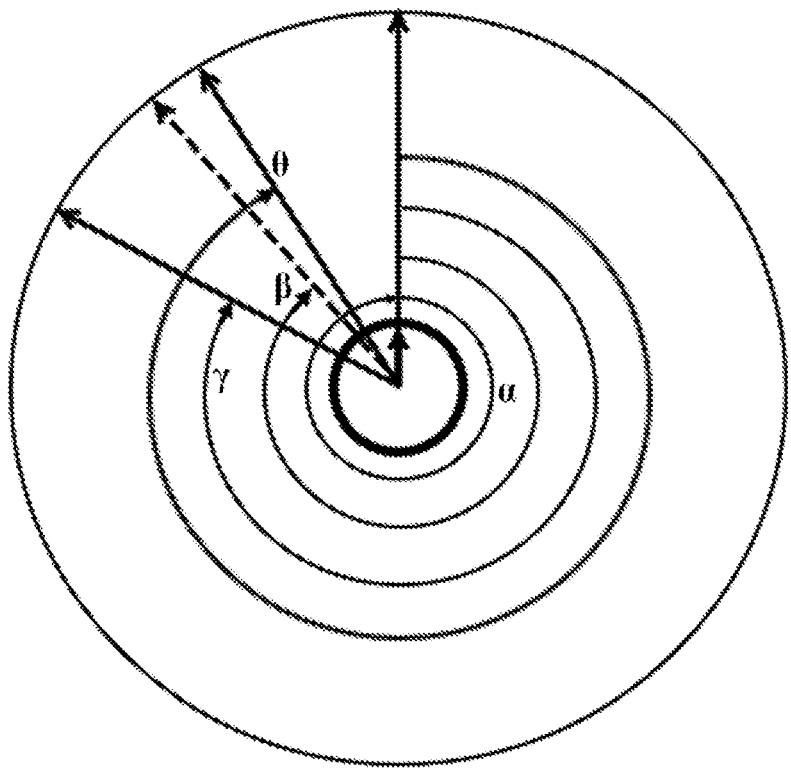
FIG. 3 is a schematic illustration of an actual rotation angle $\beta$ of the autonomous mobile device being smaller than a first predetermined angle $\theta$, and the actual rotation angle $\beta$ being greater than a second predetermined angle $\gamma$, according to an embodiment of the present disclosure.

The rotation of the autonomous mobile device can be realized through rotation of a motion assembly, such as a wheel assembly. The predetermined rotation angle may be any angle greater than 0°, such as: 90°, 180°, 270°, or 360°, etc. In the description of this embodiment, as an example, the predetermined rotation angle α is presumed to be 360°, as shown in FIG. 2 and FIG. 3.

S120, obtaining an actual rotation velocity of the autonomous mobile device.

After the autonomous mobile device receives and executes the control instructions, the actual rotation angle of the autonomous mobile device may be obtained. In the present disclosure, the predetermined rotation angle and the actual rotation angle include the predetermined rotation angle and the actual rotation angle within a same set time period or within a unit time period. For example, the control instructions may require the autonomous mobile device to rotate, within 20 seconds, at a same location for a predetermined rotation angle of 360°. Then, obtaining the actual rotation angle of the autonomous mobile device means obtaining the actual rotation angle of the autonomous mobile device within the same 20 seconds.

S130, comparing the actual rotation angle with the predetermined rotation angle, when the actual rotation angle is smaller than the predetermined rotation angle, and the actual rotation angle is greater than the a first predetermined angle, determining the floor material as a low-resistance material; when the actual rotation angle is smaller than the first predetermined angle, determining the floor material as a high-resistance material, wherein the first predetermined angle is smaller than the predetermined rotation angle.

The first predetermined angle may be greater than 0° and smaller than the predetermined rotation angle, which may be used to eliminate false determination due to errors or malfunction of sensors, such as measurement errors of a gyroscope, etc. Illustratively, when the predetermined rotation angle is set to be 360°, the range of the first predetermined angle may be from about 300° to about 330°. In the description of this embodiment, as an example, the first predetermined angle is presumed to be 330°.

Specifically, as shown in FIG. 2, when the actual rotation angle β of the autonomous mobile device is 350°, at this moment, the actual rotation angle β is smaller than the predetermined rotation angle α=360°, and the actual rotation angle β is greater than the first predetermined angle θ=330°. It may be determined that the actual rotation angle β is relatively close to the predetermined rotation angle α. The angle difference (α−β) may be caused by errors in the gyroscope, and may not be caused by the change in the floor material. Therefore, it may be determined that the floor material is a low-resistance material.

When the actual rotation angle β is 320°, as shown in FIG. 3, at this moment, the actual rotation angle β is smaller than the first predetermined angle θ=330°. This means that the actual rotation angle β is far from the predetermined rotation angle α=360°. It may be determined that the angle difference is caused by the resistance of the floor material to the autonomous mobile device. Thus, it may be determined that the floor material is a high-resistance material. In general, when the autonomous mobile device moves on a floor made of a high-resistance material, such as a long-fiber carpet, slippage may occur to the motion assembly of the autonomous mobile device, such as the wheel assembly. In other words, at some portions of the floor, the wheel assembly may idle due to an overly large resistance, causing the predetermined velocity in the control instructions to be different from the actual moving velocity on the floor. In other words, due to the high resistance, the rotation speed of the wheel assembly may not have been completely converted into the distance traversed by the autonomous mobile device on the floor. It should be noted that, in the present disclosure, a floor made of a low-resistance material refers to a floor material where slippage does not occur when the autonomous mobile device moves on the floor material, such as a wood or porcelain floor, a granite floor, etc. A floor made of a high-resistance material refers to a floor material where slippage sometimes occurs to the autonomous mobile device when the autonomous mobile device moves on the floor material, such as a long-fiber carpet, etc. Therefore, in the present disclosure, a floor made of a the low-resistance material and a floor made of a high-resistance material represent a simple and convenient classification of floor materials, and are not divisions rigorously based on resistance values.

In the floor material recognition method for the autonomous mobile device, a comparison is made between the actual rotation angle $\beta$ of the autonomous mobile device and the predetermined rotation angle $\alpha$, and a comparison is made between the actual rotation angle $\beta$ and the first predetermined angle $\theta$, thereby determining different floor materials that may or may not affect the actual moving velocity of the autonomous mobile device. The autonomous mobile device may automatically recognize floors (or floor portions) made of different materials, and may execute different functions or operate in different work modes based on different floor materials. As a result, the adaptability of the autonomous mobile device to the environment and the intelligent level can be enhanced. For example, when recognizing that the autonomous mobile device is moving on a floor made of a low-resistance material, the autonomous mobile device may execute a wet-mopping function (e.g., start the wet-mopping function or allow the wet-mopping function to be started). When recognizing that the autonomous mobile device is moving on a carpet made of a high-resistance material, the autonomous mobile device may circumvent the carpet zone (e.g., moving backwardly and turn until it is determined that the autonomous mobile device is no longer moving on a floor made of the high-resistance material) or may stop the wet-mopping function (e.g., shut down the wet-mopping function or disable the start of the wet-mopping function) and raise a mopping plate. Alternatively, when recognizing that the autonomous mobile device is moving on a carpet made of a high-resistance material, the work power of the autonomous mobile device may be increased and/or the autonomous mobile device may execute a high power mode. When recognizing that the autonomous mobile device is moving on a floor made of a low-resistance material, the autonomous mobile device may maintain the work power and/or may set the work mode to be a normal mode or a quiet mode, and/or start or allow start of the wet-mopping function.

FIG. 4 illustrates a floor material recognition method 200 for an autonomous mobile device, according to an embodiment of the present disclosure. The recognition method 200 may include:

S210, transmitting control instructions to the autonomous mobile device, the control instructions including commands that instruct the autonomous mobile device to rotate at a same location for a predetermined rotation angle.

Figure 5A:
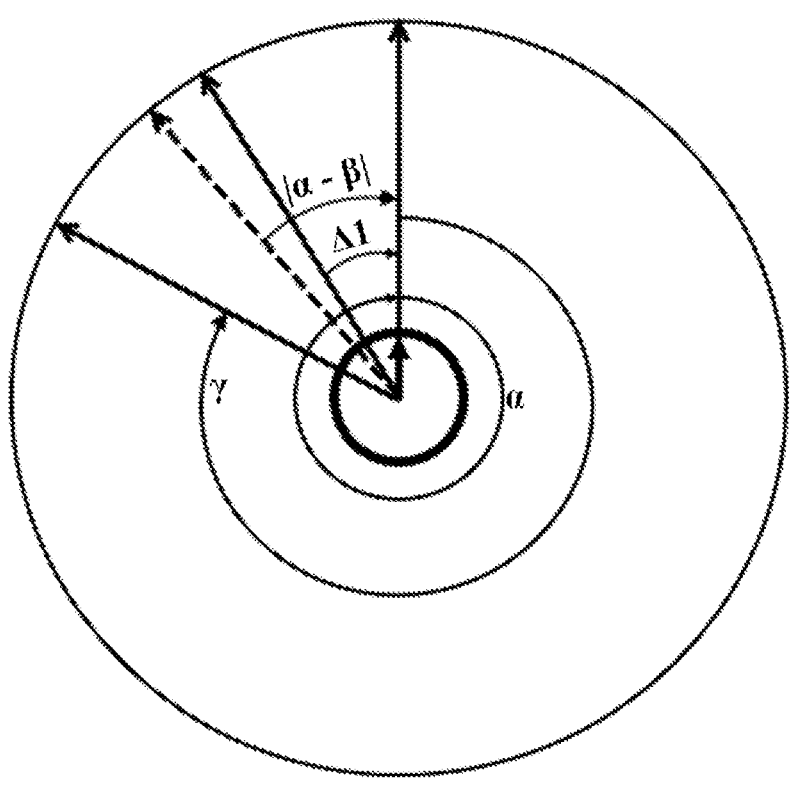
FIG. 5a is a schematic illustration of an actual rotation angle $\beta$ of the autonomous mobile device being smaller than a predetermined rotation angle $\alpha$, and an absolute value of a difference between the actual rotation angle $\beta$ and the predetermined rotation angle $\alpha$, $|\beta-\alpha|$ being greater than a first predetermined angle difference $\Delta 1$, according to an embodiment of the present disclosure.
Figure 5B:
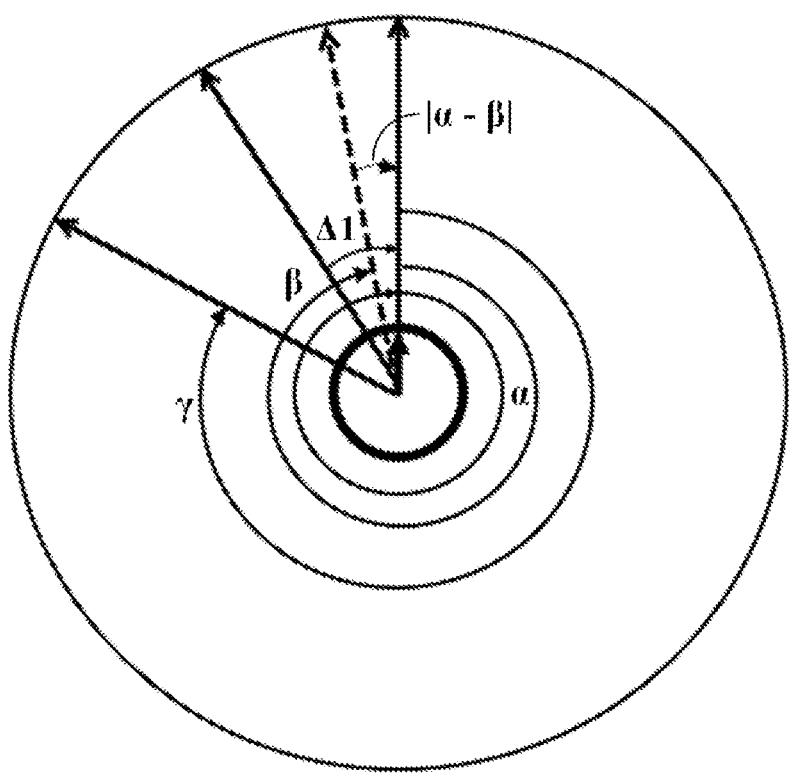
FIG. 5b is a schematic illustration of an actual rotation angle $\beta$ of the autonomous mobile device being smaller than a predetermined rotation angle $\alpha$, and an absolute value of a difference between the actual rotation angle $\beta$ and the predetermined rotation angle $\alpha$, $|\beta-\alpha|$ being smaller than a first predetermined angle difference $\Delta 1$, according to an embodiment of the present disclosure.

The rotation of the autonomous mobile device can be realized through rotation of a motion assembly, such as a wheel assembly. The predetermined rotation angle may be any angle greater than 0°, such as: 90°, 180°, 270°, or 360°, etc. In the description of this embodiment, as an example, the predetermined rotation angle $\alpha$ is presumed to be 360°, as shown in FIG. 5a and FIG. 5b.

S220, obtaining an actual rotation angle of the autonomous mobile device.

After the autonomous mobile device receives and executes the control instructions, the actual rotation angle of the autonomous mobile device may be obtained. In the present disclosure, the predetermined rotation angle and the actual rotation angle include the predetermined rotation angle and the actual rotation angle within a same set time period or within a unit time period. For example, the control instructions may require the autonomous mobile device to rotate, within 20 seconds, at a same location for a predetermined rotation angle of 360°. Then, obtaining the actual rotation angle of the autonomous mobile device means obtaining the actual rotation angle of the autonomous mobile device within the same 20 seconds.

S230, comparing the actual rotation angle with a predetermined rotation angle, when the actual rotation angle is smaller than the predetermined rotation angle, and an absolute value of a difference between the actual rotation angle and the predetermined rotation angle is greater than a first predetermined angle difference, determining that a floor material is a high-resistance material; when the actual rotation angle is smaller than the predetermined rotation angle, and the absolute value of the difference between the actual rotation angle and the predetermined rotation angle is smaller than the first predetermined angle difference, determining that the floor material is a low-resistance material.

The first predetermined angle difference may be greater than 0° and smaller than 360°. Illustratively, the range of the first predetermined angle difference may be from about 30° to about 60°. This embodiment is described based on the predetermined rotation angle being 360°, and the first predetermined angle difference being 30°, as an example.

Specifically, as shown in FIG. 5a, when the actual rotation angle $\beta$ of the autonomous mobile device is 320°, the actual rotation angle $\beta$ is smaller than the predetermined rotation angle $\alpha$=360°, and an absolute value of a difference between the actual rotation angle $\beta$ (e.g., 320°) and the predicted rotation angle $\alpha$ (360°), $|\beta-\alpha|$=40°, is greater than a first predetermined angle difference $\Delta 1$ (e.g., 30°), it indicates that the actual rotation angle $\beta$ (e.g., 320°) is far less than the predetermined rotation angle $\alpha$ (e.g., 360°). It may be determined that the angle difference 40° between the actual rotation angle $\beta$ (e.g., 320°) and the predetermined rotation angle $\alpha$ (e.g., 360°) is caused by slippage due to a high-resistance floor material, and thus, the floor material may be determined as a high-resistance material.

When the actual rotation angle $\beta$ is 350°, as shown in FIG. 5b, the actual rotation angle $\beta$ is smaller than the predetermine rotation angle $\alpha$ (e.g., 360°), and the absolute value of the difference between the actual rotation angle $\beta$ (e.g., 350°) and the predetermined rotation angle $\alpha$ (e.g., 360°), $|\beta-\alpha|$=10°, is less than the first predetermined angle difference $\Delta 1$ (e.g., 30°), it indicates that the difference between the actual rotation angle $\beta$ and the predetermined rotation angle $\alpha$ is relatively small. The angle difference may be caused by errors in a gyroscope, and may not be caused by the change in the floor material. Therefore, the floor material may be determined as a low-resistance material.

In this embodiment, through comparing the actual rotation angle of the autonomous mobile device and the predetermined rotation angle, or comparing the absolute value of the difference between the actual rotation angle and the predetermined rotation angle with the first predetermined angle difference, different floor materials having different effects on the actual moving velocity of the autonomous mobile device may be determined.

The above-described first predetermined angle or first predetermined angle difference may be obtained through testing on corresponding low-resistance floor material and high-resistance floor material. It should be noted that the predetermined rotation angle may be pre-set. The first predetermined angle or first predetermined angle difference may be determined based on the predetermined rotation angle and the different types of floor materials. When the predetermined rotation angle is not 360°, for example, when the predetermined rotation angle is configured as 180°, then the first predetermined angle or the first predetermined angle difference may need to be determined through testing on different floor materials having different resistances under this predetermined rotation angle.

In some embodiments, after steps S130 or S230, the recognition method 100 or the recognition method 200 may also include:

when the floor material is a high-resistance material, configuring a set velocity of the autonomous mobile device to be: $V_{set}=K \times V_{target}$; wherein, $V_{set}$ is the set velocity, $V_{target}$ is a target velocity, K is a coefficient, and K>1; when the actual rotation angle is greater than a second predetermined angle, or, the absolute value of the difference between the actual rotation angle and the predetermined rotation angle is greater than the first predetermined angle difference and smaller than a second predetermined angle difference, then $K=A \times (\alpha - \beta)$, $\alpha$ is the predetermined rotation angle, $\beta$ is the actual rotation angle, A is a constant; or, when the actual rotation angle is smaller than the second predetermined angle, or, when the absolute value of the difference between the actual rotation angle and the predetermined rotation angle is greater than the second predetermined angle difference, then $K=A \times \Delta 2$, where, $\Delta 2$ is the second predetermined angle difference, A is a constant.

The second predetermined angle is smaller than the first predetermined angle, the second predetermined angle difference is greater than the first predetermined angle difference. The target velocity is a moving velocity for the autonomous mobile device to reach when moving on the floor as required by the control instructions (in some embodiments, the unit of the target velocity or the actual moving velocity may be meter/second or meter/minute). The set velocity is a velocity for the motion assembly of the autonomous mobile device to reach, as required by the control instructions, in order for the autonomous mobile device to reach the target velocity (in some embodiments, the unit of the set velocity may be round/second or round/minute).

Illustratively, when the autonomous mobile device moves on a low-resistance floor that may not cause slippage to the autonomous mobile device, the set velocity included in the control instructions may be substantially the same as the actual moving velocity of the autonomous mobile device on the floor. Then the set velocity of the autonomous mobile device configured in the control instructions is substantially the same as the desired or required target velocity of the autonomous mobile device on the floor. When the autonomous mobile device moves on a high-resistance floor, through the above method, a determination may be made that the autonomous mobile device is moving on a high-resistance floor. The autonomous mobile device may adjust its set velocity, such that, after the situation of slippage on the high-resistance floor is taken into consideration, the actual moving velocity on the floor reaches the above target velocity, such that the autonomous mobile device can maintain consistent actual moving velocity on different types of floors, thereby ensuring the work efficiency of the autonomous mobile device.

Because slippage often occurs to the autonomous mobile device on a high-resistance floor, the set velocity corresponding to the actual moving velocity of the autonomous mobile device on the high-resistance floor is greater than the set velocity corresponding to the actual moving velocity of the autonomous mobile device on a low-resistance floor, such that the autonomous mobile device can maintain consistent actual moving velocity on different types of floors, thereby ensuring the work efficiency of the autonomous mobile device.

When the floor is made of a low-resistance floor material, the set velocity may be configured to be the target velocity, i.e., $V_{set}=V_{target}$. In the equation of $V_{set}=K \times V_{target}$, here, the coefficient K=1. When the floor is determined to be made of a high-resistance floor material, the set velocity may be configured as: $V_{set}=K \times V_{target}$, wherein $V_{set}$ is the set velocity, $V_{target}$ is the target velocity, K is the coefficient, and K>1. Specifically, for example, K may be 1.5, which may be obtained through test. The set velocity $V_{set}$ may be set as 1.5 times of $V_{target}$, such that the actual moving velocity of the autonomous mobile device on a high-resistance floor can reach $V_{target}$, which is substantially consistent with the actual moving velocity of the autonomous mobile device on a low-resistance floor.

In some embodiments, the coefficient K may be obtained using the following methods. For the convenience of description, the following parameters are pre-configured: predetermined rotation angle is $\alpha$, actual rotation angle is $\beta$, first predetermined angle is $\theta$, second predetermined angle is $\gamma$, first predetermined angle difference is $\Delta 1$, second predetermined angle difference is $\Delta 2$.

In the embodiment in which the floor material is determined to be a high-resistance floor material, further, when the actual rotation angle $\beta$ (e.g., 320°) is greater than the second predetermined angle $\gamma$ (e.g., 300°), as shown in FIG. 3. Or, when the absolute value of the difference between the actual rotation angle $\beta$ (e.g., 320°) and the predetermined rotation angle $\alpha$ (e.g., 360°), $|\beta - \alpha|$ (e.g., 40°) is greater than the first predetermined angle difference $\Delta 1$ (illustratively, for example, as shown in FIG. 5a, $\Delta 1$ is the difference between the predetermined rotation angle $\alpha$ and the first predetermined angle $\theta$, i.e., $\Delta 1=(\alpha - \theta)$, for example, 30° in FIG. 5a) and is smaller than the second predetermined angle difference $\Delta 2$ (illustratively, for example, as shown in FIG. 5a, $\Delta 2$ is the difference between the predetermined rotation angle $\alpha$ and the second predetermined angle $\gamma$ (e.g., 300°), i.e., $\Delta 2=(\alpha - \gamma)$, for example, 60° in FIG. 5a), then $K=A \times (\alpha - \beta)$, where A is a constant. $(\alpha - \beta)=|\beta - \alpha|$, which is a positive value. In other words, in this situation, as the actual rotation angle $\beta$ increases, the value of K decreases, then $V_{set}$ is closer to $V_{target}$. The above constant A can be approximately obtained through test on the high-resistance floor. Approximately obtaining A means that on the high-resistance floor, although the value of the K, which is the ratio between the set velocity and the target velocity, does not necessarily have a linear relationship with $(\alpha - \beta)$, for the simplicity of computation, the linear relationship may be used to fit the relationship between the value of K and $(\alpha-\beta)$. Therefore, a coefficient K that is close to the actual value may be estimated without using a large amount of computation. The set velocity for the wheel assembly to reach may be relatively easily estimated based on the target velocity the autonomous mobile device is configured to reach while moving on the floor. Specifically, illustratively, multiple values of constant A may be measured on different types of floor materials having different $(\alpha-\beta)$, the arithmetic mean or the weighted mean (the weight may be set by taking into account a main factor which is the sales ratio of different types of carpets in the target market of the autonomous mobile device, or multiple weights may be determined based on market data), or a value of constant A measured on a most popular type of carpet, may be used as the value of A in formula $K=A\times(\alpha-\beta)$. For example, the actual moving velocity measured on a certain type of carpet may be 100 mm/s (during measurement, the actual moving velocity on the floor corresponds to the target velocity). The corresponding set velocity may be 150 mm/s. Then, based on $V_{set}=K\times V_{target}$, $K=150/100=1.5$ may be obtained. During rotation, it may be measured that $(\alpha-\beta)=40°$. Based on $K=A\times(\alpha-\beta)$, it can be obtained that $A=1.5/40=0.0375$ (unit omitted). This value of constant A may be set in the program. In actual movement, when moving on a carpet, the set velocity may be computed based on this value of constant A, the difference $(\alpha-\beta)$ between the actual rotation angle and the predetermined rotation angle, and the target velocity the autonomous mobile device need to reach (for example, during a normal operation, the autonomous mobile device may be required to move on a floor at a target velocity of 250 mm/s, and during a return-for-recharging process (returning to a charging base) the autonomous mobile device may be required to move on the floor at a target velocity of 150 mm/s). The control instructions may instruct the wheel assembly to reach this set velocity, such that the autonomous mobile device may reach an actual moving velocity (i.e., the target velocity) that is substantially consistent with the moving velocity on a low-resistance floor.

Figure 6A:
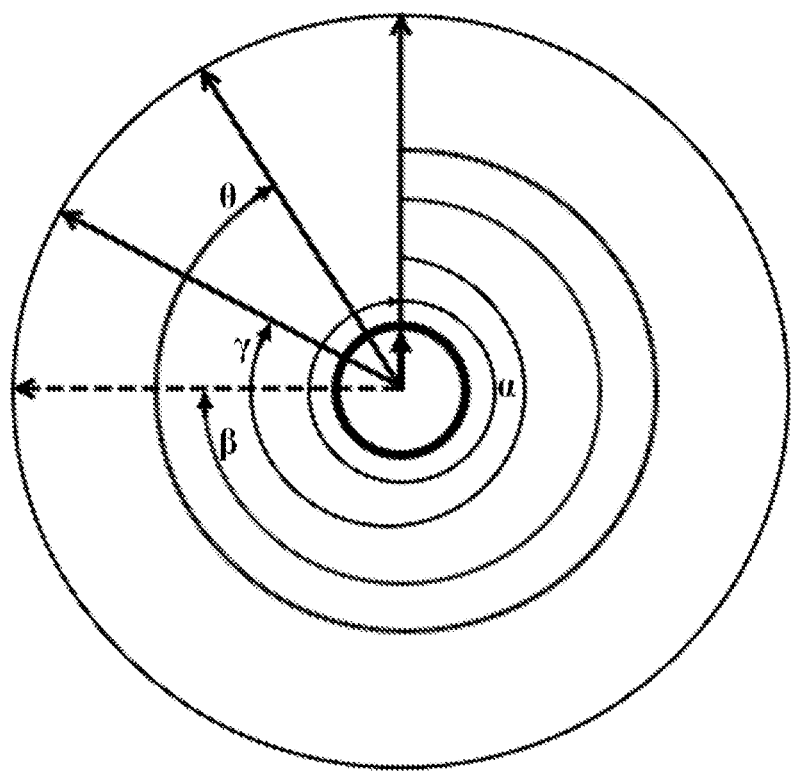
FIG. 6a is a schematic illustration of an actual rotation angle $\beta$ of the autonomous mobile device being smaller than a second predetermined angle $\gamma$, according to an embodiment of the present disclosure.
Figure 6B:
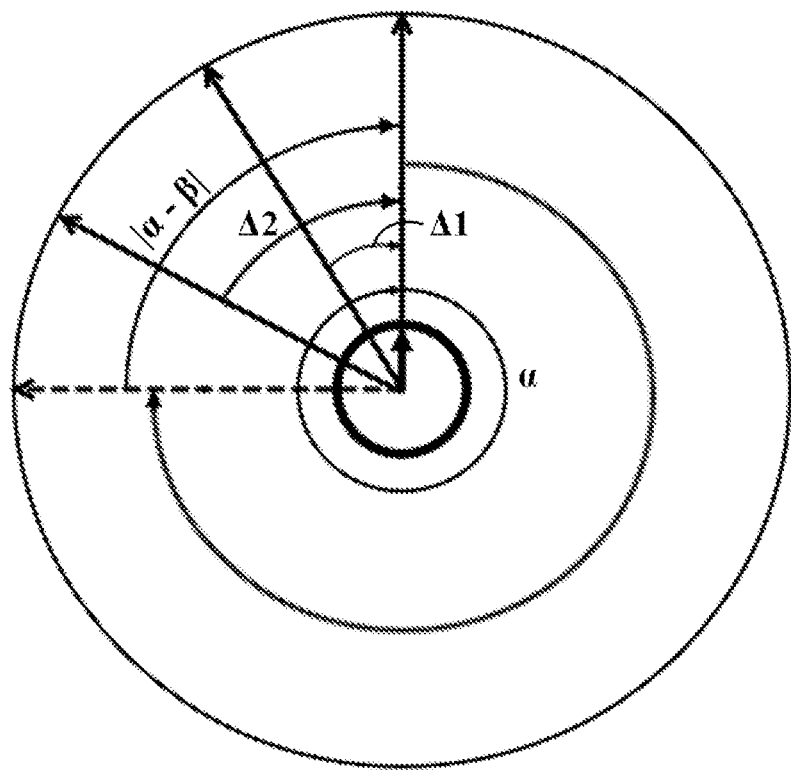
FIG. 6b is a schematic illustration of an actual rotation angle $\beta$ of the autonomous mobile device being smaller than a predetermined rotation angle $\alpha$, and an absolute value of a difference between the actual rotation angle $\beta$ and the predetermined rotation angle $\alpha$, $|\beta-\alpha|$ being greater than a second predetermined angle difference Δ2, according to an embodiment of the present disclosure.

In some embodiments, when the actual rotation angle $\beta$ is smaller than the second predetermined angle $\gamma$, as shown in FIG. 6a, or, when the absolute value of the difference between the actual rotation angle $\beta$ and the predetermined angle $\alpha$, $|\beta-\alpha|$, is greater than the second predetermined angle difference $\Delta 2$, as shown in FIG. 6b, then $K=A\times\Delta 2$. Illustratively, the second predetermined angle difference $\Delta 2$ may be a difference between the predetermined rotation angle $\alpha$ and the second predetermined angle $\gamma$, i.e., $\Delta 2=(\alpha-\gamma)$, where, A is a constant.

As can be seen in the figures, the second predetermined angle $\gamma$ is smaller than the first predetermined angle $\alpha$, the second predetermined angle difference $\Delta 2$ is greater than the first predetermined angle difference $\Delta 1$. As described above, the target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

In some embodiments, after step S130 or S230, the recognition method 100 or the recognition method 200 may also include:

when it is determined that the floor material is a high-resistance material, increasing a work power of the autonomous mobile device and/or setting a work mode to be a high power mode; when it is determined that the floor material is a low-resistance material, maintaining the work power of the autonomous mobile device and/or setting the work mode to be a normal or quiet work mode.

Illustratively, the autonomous mobile device in this embodiment may be a smart floor sweeping robot. The smart floor sweeping robot may include a main body, a motion assembly disposed at the bottom of the main body, a vacuum cleaner disposed inside the main body. The vacuum cleaner may include a dust box. When the smart floor sweeping robot operates in a sweeping-mopping mode, the motion assembly may cause the main body to move on the floor, and the vacuum cleaner may suck trashes on the floor into the dust box, thereby realizing cleaning of the floor.

Because when working on a high-resistance floor material, such as a carpet, components of the smart floor sweeping robot, such as the vacuum cleaner, the main brush, and the chassis, may experience a much higher resistance than when working on a low-resistance floor material, therefore, after determining the type of the floor material, based on the floor material, the work power of the vacuum cleaner and/or the main brush electric motor may be adjusted. When the floor material is a high-resistance material, the work power may be controlled to be a first power; when the floor material is a low-resistance material, the work power may be controlled to be a second power, the first power may be greater than the second power, such that the cleaning efficiency of the smart floor sweeping robot on the high-resistance material may be substantially equal to the cleaning efficiency on the low-resistance material.

In some embodiments, the autonomous mobile device may be a smart cleaning robot that integrates the floor sweeping and floor mopping functions. When the smart cleaning robot determines, based on the above embodiment, that the floor material is a high-resistance floor material, such as a carpet, the autonomous mobile device may control the work mode to be a first floor sweeping-mopping mode. In this mode, the smart cleaning robot may only perform floor sweeping, and the power of the vacuum cleaner is a first power. When the smart cleaning robot determines that the floor material is a low-resistance floor material, the autonomous mobile device may switch the work mode to a second floor sweeping-mopping mode. In this mode, the smart cleaning robot may perform floor sweeping and/or floor mopping, and the work power of the cleaning components may be a second power, the first power may be greater than the second power, i.e., the work power of the autonomous mobile device is increased and/or the work mode is set to be a high power mode. When the floor material is determined to be a low-resistance material, the work power of the autonomous mobile device may be maintained and/or the work mode may be set to be a normal or quiet work mode. As such, the cleaning efficiency of the smart floor sweeping robot on a high-resistance material may be substantially the same as the cleaning efficiency on the low-resistance material. Suitable work tasks may be carried out by the smart cleaning robot based on the floor material.

FIG. 7 illustrates a control method 300 for controlling the moving velocity of the autonomous mobile device, according to an embodiment of the present disclosure. The control method 300 may include:

S310, transmitting control instructions to the autonomous mobile device, the control instructions including commands that instruct the autonomous mobile device to rotate at a same location for a predetermined rotation angle.

The rotation of the autonomous mobile device can be realized through rotation of a motion assembly, such as a wheel assembly. The predetermined rotation angle may be any angle greater than 0°, such as: 90°, 180°, 270°, or 360°, etc. In the description of this embodiment, as an example, the predetermined rotation angle $\alpha$ is presumed to be 360°, as shown in FIG. 3 and FIG. 5a.

S320, obtaining an actual rotation angle of the autonomous mobile device.

After the autonomous mobile device receives and executes the control instructions, the actual rotation angle of the autonomous mobile device may be obtained. In the present disclosure, the predetermined rotation angle and the actual rotation angle include the predetermined rotation angle and the actual rotation angle within a same set time period or within a unit time period. For example, the control instructions may require the autonomous mobile device to rotate, within 20 seconds, at a same location for a predetermined rotation angle of 360°. Then, obtaining the actual rotation angle of the autonomous mobile device means obtaining the actual rotation angle of the autonomous mobile device within the same 20 seconds.

S330, comparing the actual rotation angle with the predetermined rotation angle, when the actual rotation angle is smaller than a first predetermined angle, or, when the actual rotation angle is smaller than the predetermined rotation angle and an absolute value of a difference between the actual rotation angle and the predetermined rotation angle is greater than a first predetermined angle difference, configuring a set velocity of the autonomous mobile device to be: $V_{set}=K \times V_{target}$; wherein, $V_{set}$ is the set velocity, $V_{target}$ is a target velocity, K is a coefficient, and K>1. The target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

When the actual rotation angle is greater than a second predetermined angle, or, the absolute value of the difference between the actual rotation angle and the predetermined rotation angle is greater than the first predetermined angle difference and smaller than a second predetermined angle difference, then $K=A \times (\alpha - \beta)$, $\alpha$ is the predetermined rotation angle, $\beta$ is the actual rotation angle, A is a constant.

When the actual rotation angle is smaller than the second predetermined angle, or, when the absolute value of the difference between the actual rotation angle and the predetermined rotation angle is greater than the second predetermined angle difference, then $K=A \times \Delta 2$, where, $\Delta 2$ is the second predetermined angle difference, A is a constant.

In some embodiments, the first predetermined angle is smaller than the predetermined rotation angle, the second predetermined rotation angle is smaller than the first predetermined angle, the second predetermined angle difference is greater than the first predetermined angle difference. The control method also includes: controlling the autonomous mobile device to move on the floor at the target velocity.

Specifically, as shown in FIG. 3, when the actual rotation angle $\beta$ is 320°, at this moment, the actual rotation angle $\beta$ is smaller than the first predetermined angle $\theta=330°$. This means that the actual rotation angle $\beta$ is far from the predetermined rotation angle $\alpha=360°$. It may be determined that the angle difference is caused by the resistance of the floor material to the autonomous mobile device. Thus, it may be determined that the floor material is a high-resistance material.

As shown in FIG. 5a, when the actual rotation angle $\beta$ of the autonomous mobile device is 320°, the actual rotation angle $\beta$ is smaller than the predetermined rotation angle $\alpha=360°$, and an absolute value of a difference between the actual rotation angle $\beta$ (320°) and the predicted rotation angle $\alpha$ (360°), $|\beta - \alpha| = 40°$, is greater than a first predetermined angle difference $\Delta 1$ (30°), it indicates that the actual rotation angle $\beta$ (320°) is far less than the predetermined rotation angle $\alpha$ (360°). It may be determined that the angle difference 40° between the actual rotation angle $\beta$ (320°) and the predetermined rotation angle $\alpha$ (360°) is caused by slippage due to a high-resistance floor material, and thus, the floor material may be determined as a high-resistance material.

In general, when the autonomous mobile device moves on a floor made of a high-resistance material, such as a long-fiber carpet, slippage may occur to the motion assembly of the autonomous mobile device, such as the wheel assembly. In other words, at some portions of the floor, the wheel assembly may idle due to an overly large resistance, causing the predetermined velocity in the control instructions to be different from the actual moving velocity on the floor. In other words, due to the high resistance, the rotation speed of the wheel assembly may not have been completely converted into the distance traversed by the autonomous mobile device on the floor. It should be noted that, in the present disclosure, a floor made of a high-resistance material refers to a floor material where slippage sometimes occurs to the autonomous mobile device when the autonomous mobile device moves on the floor material, such as a long-fiber carpet, etc.

When the floor material is a high-resistance material, a set velocity of the autonomous mobile device may be configured to be: $V_{set}=K \times V_{target}$, K>1. Because slippage often occurs to the autonomous mobile device on a high-resistance floor, the set velocity corresponding to the actual moving velocity of the autonomous mobile device on the high-resistance floor is greater than the set velocity corresponding to the actual moving velocity of the autonomous mobile device on a low-resistance floor, such that the autonomous mobile device can maintain consistent actual moving velocity on different types of floors, thereby ensuring the work efficiency of the autonomous mobile device.

When the floor is determined to be made of a high-resistance floor material, the set velocity may be configured as: $V_{set}=K \times V_{target}$, wherein $V_{set}$ is the set velocity, $V_{target}$ is the target velocity, K is the coefficient, and K>1. Specifically, for example, K may be 1.5, which may be obtained through test. The set velocity $V_{set}$ may be set as 1.5 times of $V_{target}$, such that the actual moving velocity of the autonomous mobile device on a high-resistance floor is $V_{target}$, which is substantially consistent with the actual moving velocity of the autonomous mobile device on a low-resistance floor.

In some embodiments, the coefficient K may be obtained using the following methods. For the convenience of description, the following parameters are pre-configured: predetermined rotation angle is $\alpha$, actual rotation angle is $\beta$, first predetermined angle is $\theta$, second predetermined angle is $\gamma$, first predetermined angle difference is $\Delta 1$, second predetermined angle difference is $\Delta 2$.

In the embodiment in which the floor material is determined to be a high-resistance floor material, further, when the actual rotation angle $\beta$ (e.g., 320°) is greater than the second predetermined angle $\gamma$ (e.g., 300°), as shown in FIG. 3. Or, when the absolute value of the difference between the actual rotation angle $\beta$ (320°) and the predetermined rotation angle α (360°), |β−α| (40°) is greater than the first predetermined angle difference Δ1 (illustratively, for example, as shown in FIG. 5a, Δ1 is the difference between the predetermined rotation angle α and the first predetermined angle θ, i.e., Δ1=(α−θ), for example, 30° in FIG. 5a) and is smaller than the second predetermined angle difference Δ2 (illustratively, for example, as shown in FIG. 5a, Δ2 is the difference between the predetermined rotation angle α and the second predetermined angle γ (e.g., 300°), i.e., Δ2=(α−γ), for example, 60° in FIG. 5a), then K=A×(α−β), where A is a constant. (α−β)=|β−α|, which is a positive value. In other words, in this situation, as the actual rotation angle β increases, the value of constant K decreases, then $V_{set}$ is closer to $V_{target}$. The above constant A can be approximately obtained through test on the high-resistance floor. Approximately obtaining constant A means that on the high-resistance floor, although the value of the constant K, which is the ratio between the set velocity and the target velocity, does not necessarily have a linear relationship with (α−β), for the simplicity of computation, the linear relationship may be used to fit the relationship between the value of K and (α−β). Therefore, a coefficient K that is close to the actual value may be estimated without using a large amount of computation. The set velocity for the wheel assembly to reach may be relatively easily estimated based on the target velocity the autonomous mobile device is configured to reach while moving on the floor. Specifically, illustratively, multiple values of constant A may be measured on different types of floor materials having different (α−β), the arithmetic mean or the weighted mean (the weight may be set by taking into account a main factor which is the sales ratio of different types of carpets in the target market of the autonomous mobile device, or multiple weights may be determined based on market data), or a value of A measured on a most popular type of carpet, may be used as the value of constant A in formula K=A×(α−β). For example, the actual moving velocity measured on a certain type of carpet may be 100 mm/s (during measurement, the actual moving velocity on the floor corresponds to the target velocity). The corresponding set velocity may be 150 mm/s. Then, based on $V_{set}$=K×$V_{target}$, K=150/100=1.5 may be obtained. During rotation, it may be measured that (α−β)=40°. Based on K=A×(α−β), it can be obtained that A=1.5/40=0.0375 (unit omitted). This value of A may be set in the program. In actual movement, when moving on a carpet, the set velocity may be computed based on this value of A, the difference (α−β) between the actual rotation angle and the predetermined rotation angle, and the target velocity the autonomous mobile device need to reach (for example, during a normal operation, the autonomous mobile device may be required to move on a floor at a target velocity of 250 mm/s, and during a return-for-recharging process (returning to a charging base) the autonomous mobile device may be required to move on the floor at a target velocity of 150 mm/s). The control instructions may instruct the wheel assembly to reach this set velocity, such that the autonomous mobile device may reach an actual moving velocity (i.e., the target velocity) that is substantially consistent with the moving velocity on a low-resistance floor.

In some embodiments, when the actual rotation angle β is smaller than the second predetermined angle γ, as shown in FIG. 6a, or, when the absolute value of the difference between the actual rotation angle β and the predetermined angle α, |β−α|, is greater than the second predetermined angle difference Δ2, as shown in FIG. 6b, then K=A×Δ2. Illustratively, the second predetermined angle difference Δ2 may be a difference between the predetermined rotation angle α and the second predetermined angle γ, i.e., Δ2=(α−γ), where, A is a constant.

As can be seen in the figures, the second predetermined angle γ is smaller than the first predetermined angle α, the second predetermined angle difference Δ2 is greater than the first predetermined angle difference Δ1. As described above, the target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

S340, controlling the autonomous mobile device to move on the floor at the target velocity.

Figure 8:
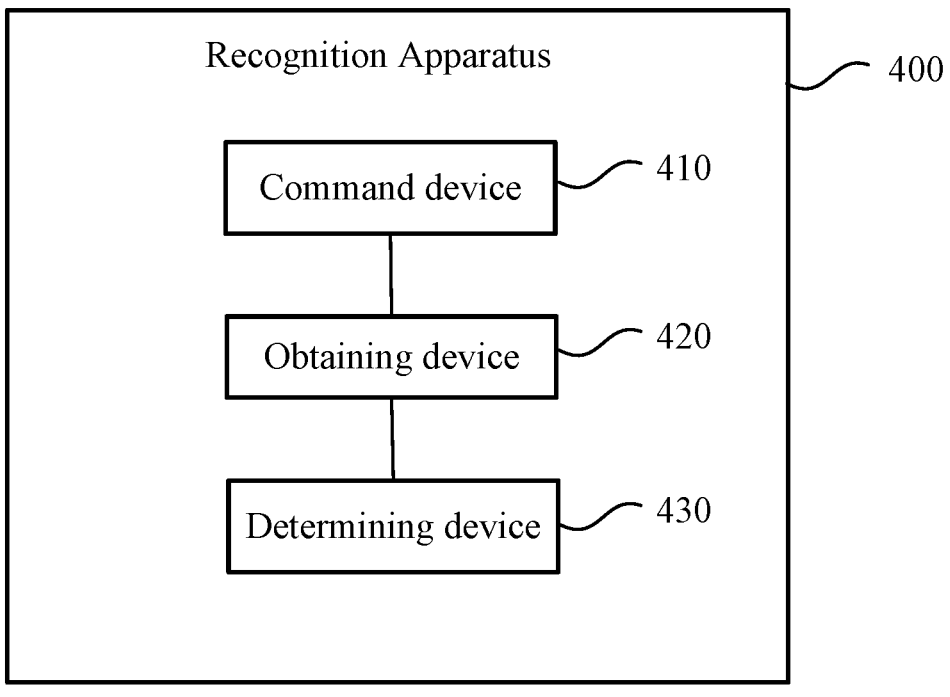
FIG. 8 is a first schematic diagram of a recognition apparatus for the autonomous mobile device for recognizing a floor material, according to an embodiment of the present disclosure.

FIG. 8 schematically illustrates a recognition apparatus 400 for an autonomous mobile device for recognizing a floor material. The recognition apparatus 400 may include:

a command device 410 configured to transmit control instructions to the autonomous mobile device, the control instructions including commands that instruct the autonomous mobile device to rotate at a same location for a predetermined rotation angle.

an obtaining device 420 configured to obtain an actual rotation angle of the autonomous mobile device.

a determining device 430 configured to compare the actual rotation angle with a predetermined rotation angle, when the actual rotation angle is smaller than the predetermined rotation angle, and the actual rotation angle is greater than a first predetermined angle, determine that the floor material is a low-resistance material; when the actual rotation angle is smaller than the first predetermined angle, determine that the floor material is a high-resistance material, wherein the first predetermined angle is smaller than the predetermined rotation angle.

In the floor material recognition method for the autonomous mobile device, a comparison is made between the actual rotation angle of the autonomous mobile device and the predetermined rotation angle, and a comparison is made between the actual rotation angle and the first predetermined angle, thereby determining different floor materials that may or may not affect the moving velocity of the autonomous mobile device. The autonomous mobile device may automatically recognize floors (or floor portions) made of different materials, and may execute different functions or operate in different work modes based on different floor materials. As a result, the adaptability of the autonomous mobile device to the environment and the intelligent level can be enhanced. For example, when recognizing that the autonomous mobile device is moving on a floor made of a low-resistance material, the autonomous mobile device may execute a wet-mopping function. When recognizing that the autonomous mobile device is moving on a carpet made of a high-resistance material, the autonomous mobile device may circumvent the carpet zone or may stop the wet-mopping function and raise a mopping plate. Alternatively, when recognizing that the autonomous mobile device is moving on a carpet made of a high-resistance material, the work power of the autonomous mobile device may be increased and/or the autonomous mobile device may execute a high power mode. When recognizing that the autonomous mobile device is moving on a floor made of a low-resistance material, the autonomous mobile device may maintain the work power and/or may set the work mode to be a normal mode or a quiet mode, etc.

Figure 9:
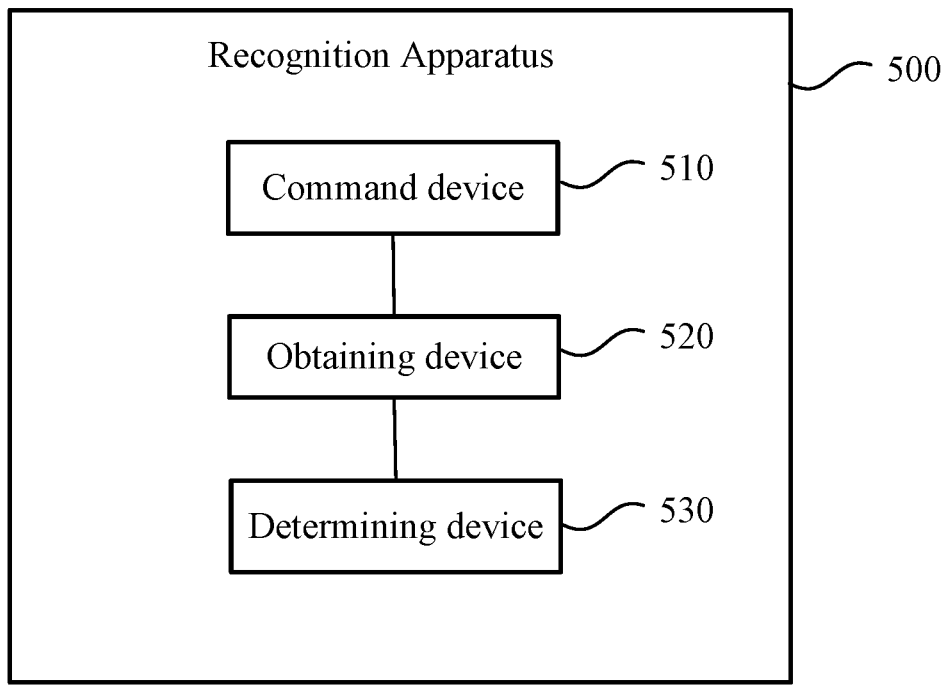
FIG. 9 is a second schematic diagram of a recognition apparatus for the autonomous mobile device for recognizing a floor material, according to an embodiment of the present disclosure.

FIG. 9 schematically illustrates a recognition apparatus 500 for an autonomous mobile device for recognizing a floor material, according to an embodiment of the present disclosure. The recognition apparatus 500 may include:

a command device 510 configured to transmit control instructions to the autonomous mobile device, the control instructions including commands that instruct the autonomous mobile device to rotate at a same location for a predetermined rotation angle;

an obtaining device 520 configured to obtain an actual rotation angle of the autonomous mobile device;

a determining device 530 configured to compare the actual rotation angle with the predetermined rotation angle, when the actual rotation angle is smaller than the predetermined rotation angle, and an absolute value of a difference between the actual rotation angle and the predetermined rotation angle is greater than a first predetermined angle difference, determining that the floor material is a high-resistance material; when the actual rotation angle is smaller than the predetermined rotation angle, and the absolute value of the difference between the actual rotation angle and the predetermined rotation angle is smaller than the first predetermined angle difference, determining that the floor material is a low-resistance material.

In the recognition apparatus for the autonomous mobile device for recognizing the floor material, according to this embodiment, through comparing the actual rotation angle of the autonomous mobile device and the predetermined rotation angle, and comparing the absolute value of the difference between the actual rotation angle and the predetermined rotation angle with the first predetermined angle difference, different floor materials having different effects on the moving velocity of the autonomous mobile device may be determined.

In some embodiments, the recognition apparatus 400 or recognition apparatus 500 may also include:

a first control device configured to, when the floor material is a high-resistance material, configure a set velocity of the autonomous mobile device to be: $V_{set}=K \times V_{target}$; wherein, $V_{set}$ is the set velocity, $V_{target}$ is a target velocity, K is a coefficient, and K>1;

when the actual rotation angle is greater than a second predetermined angle, or, the absolute value of the difference between the actual rotation angle and the predetermined rotation angle is greater than the first predetermined angle difference and smaller than a second predetermined angle difference, then $K=A \times (\alpha - \beta)$, $\alpha$ is the predetermined rotation angle, $\beta$ is the actual rotation angle, A is a constant; or, when the actual rotation angle is smaller than the second predetermined angle, or, when the absolute value of the difference between the actual rotation angle and the predetermined rotation angle is greater than the second predetermined angle difference, then $K=A \times \Delta 2$, where, $\Delta 2$ is the second predetermined angle difference, A is a constant.

The second predetermined angle is smaller than the first predetermined angle, the second predetermined angle difference is greater than the first predetermined angle difference. The target velocity is a moving velocity for the autonomous mobile device to reach when moving on the floor as required by the control instructions. The set velocity is a velocity for the motion assembly of the autonomous mobile device to reach, as required by the control instructions, in order for the autonomous mobile device to reach the target velocity.

In some embodiments, the recognition apparatus 400 or recognition apparatus 500 may also include:

a second control device configured to, when it is determined that the floor material is a high-resistance material, increase a work power of the autonomous mobile device and/or set a work mode to be a high power mode; when it is determined that the floor material is a low-resistance material, maintain the work power of the autonomous mobile device and/or set the work mode to be a normal or quiet work mode.

Figure 10:
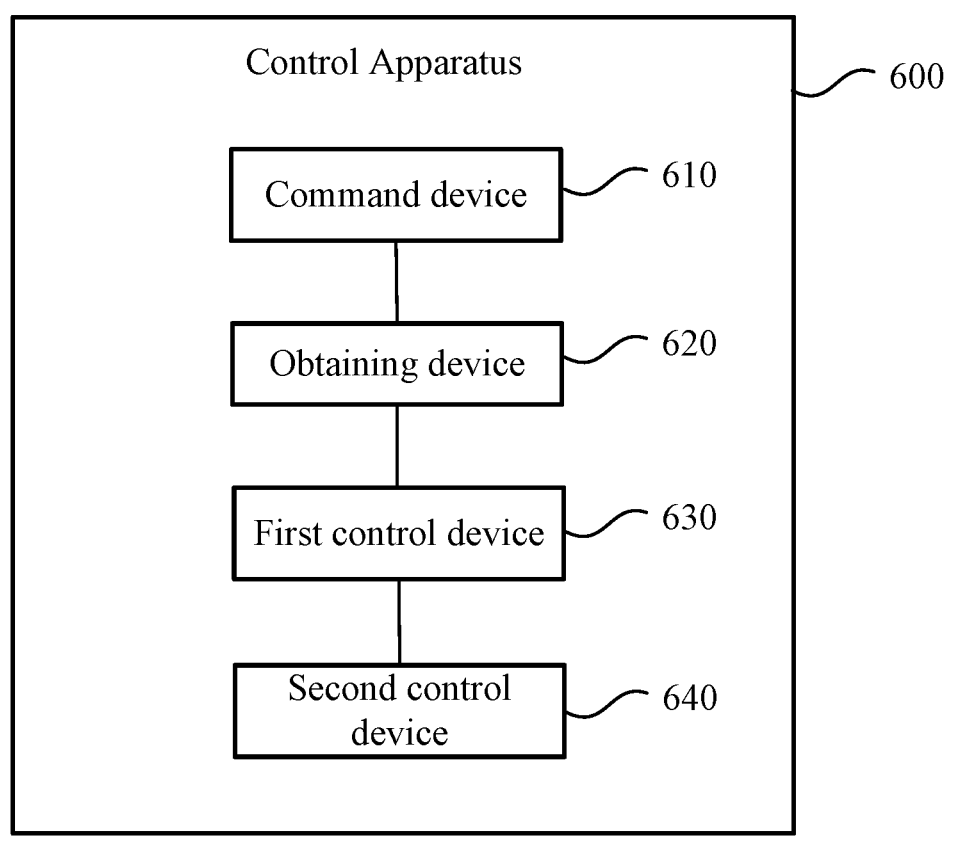
FIG. 10 is a schematic diagram of a control apparatus for controlling a moving velocity of the autonomous mobile device, according to an embodiment of the present disclosure.

FIG. 10 schematically illustrates a control apparatus 600 for controlling a moving velocity of the autonomous mobile device, according to an embodiment of the present disclosure.

The control apparatus 600 may include:

a command device 610 configured to transmit control instructions to the autonomous mobile device, the control instructions including commands that instruct the autonomous mobile device to rotate at a same location for a predetermined rotation angle;

an obtaining device 620 configured to obtain an actual rotation angle of the autonomous mobile device;

a first control device 610 configured to: compare the actual rotation angle with the predetermined rotation angle; when the actual rotation angle is smaller than a first predetermined angle, or, when the actual rotation angle is smaller than the predetermined rotation angle and an absolute value of a difference between the actual rotation angle and the predetermined rotation angle is greater than a first predetermined angle difference, configure a set velocity of the autonomous mobile device to be: $V_{set}=K \times V_{target}$; wherein, $V_{set}$ is the set velocity, $V_{target}$ is a target velocity, K is a coefficient, and K>1; the target velocity is a moving velocity for the autonomous mobile device to reach when moving on the floor as required by the control instructions; the set velocity is a velocity for the motion assembly of the autonomous mobile device to reach, as required by the control instructions, in order for the autonomous mobile device to reach the target velocity;

when the actual rotation angle is greater than a second predetermined angle, or, the absolute value of the difference between the actual rotation angle and the predetermined rotation angle is greater than the first predetermined angle difference and smaller than a second predetermined angle difference, then $K=A \times (\alpha - \beta)$, $\alpha$ is the predetermined rotation angle, $\beta$ is the actual rotation angle, A is a constant;

when the actual rotation angle is smaller than the second predetermined angle, or, when the absolute value of the difference between the actual rotation angle and the predetermined rotation angle is greater than the second predetermined angle difference, then $K=A \times \Delta 2$, where, $\Delta 2$ is the second predetermined angle difference, A is a constant;

wherein, the first predetermined angle is smaller than the predetermined rotation angle, the second predetermined rotation angle is smaller than the first predetermined angle, the second predetermined angle difference is greater than the first predetermined angle difference;

a second control device 640 configured to control the autonomous mobile device to move on a floor at the target velocity.

In the control apparatus for the autonomous mobile device, according to this embodiment, when the floor material is a high-resistance material, a set velocity of the autonomous mobile device may be configured to be: $V_{set}=K \times V_{target}$, K>1. Because slippage often occurs to the autonomous mobile device on a high-resistance floor, the set velocity corresponding to the actual moving velocity of the autonomous mobile device on the high-resistance floor is greater than the set velocity corresponding to the actual moving velocity of the autonomous mobile device on a low-resistance floor, such that the autonomous mobile device can maintain consistent actual moving velocity on different types of floors, thereby ensuring the work effi-ciency of the autonomous mobile device.

Embodiments of the present disclosure also provide a non-transitory computer-readable storage medium storing a computer program that includes computer instructions. When the computer program is executed by a computer or a processor (such as a processor or controller of the autono-mous mobile device), the floor material recognition method 100, recognition method 200, or control method 300 may be performed, for example, by the autonomous mobile device.

Finally, it should be noted that: the above embodiments are only used to explain the technical solutions of the present disclosure, and are not to limit the present disclosure; although detailed explanations have been provided for the present disclosure with reference to the above various embodiments, a person having ordinary skills in the art should understand: the person having ordinary skills in the art can modify the technical solutions described in the above various embodiments, or carry out equivalent replacement to some or all technical features. These modifications or replacements do not render relevant technical solutions to deviate from the scope of the technical solutions of various embodiments of the present disclosure.

What is claimed is:

1. A floor material recognition method for an autonomous mobile device, comprising:

transmitting control instructions to the autonomous mobile device, the control instructions including com-mands instructing the autonomous mobile device to rotate at the same location for a predetermined rotation angle;

obtaining an actual rotation angle of the autonomous mobile device;

comparing the actual rotation angle with the predeter-mined rotation angle;

determining that a floor material is a high-resistance material:

when the actual rotation angle is smaller than the predetermined rotation angle, and an absolute value of a difference between the actual rotation angle and the predetermined rotation angle is greater than a first predetermined angle difference; and based on a determination that the floor material is the high-resistance material, configuring a set velocity of the autonomous mobile device as: $V_{set}=K \times V_{target}$, wherein, $V_{set}$ is the set velocity, $V_{target}$ is a target velocity, K is a coefficient, and K>1, wherein the target velocity is a moving velocity for the autonomous mobile device to reach when moving on a floor as required by the control instructions, wherein the set velocity is a velocity for a motion assembly of the autonomous mobile device to reach, as required by the control instructions, in order for the autonomous mobile device to reach the target velocity.

2. The floor material recognition method of claim 1, further comprising:

determining that the floor material is a low-resistance material:

when the actual rotation angle is smaller than the predetermined rotation angle, and the absolute value of the difference between the actual rotation angle and the predetermined rotation angle is smaller than the first predetermined angle difference.

3. The floor material recognition method of claim 2, further comprising:

based on a determination that the floor material is the low-resistance material:

maintaining a work power of the autonomous mobile device and/or setting a work mode as a normal mode or a quiet mode; and/or starting or allowing start of a wet-mopping function.

4. The floor material recognition method of claim 1, wherein when the actual rotation angle is greater than a second predetermined angle, or, when the absolute value of the difference between the actual rotation angle and the predetermined rotation angle is greater than the first predetermined angle difference and smaller than a second predetermined angle difference, then $K=A \times (\alpha - \beta)$, wherein $\alpha$ is the predetermined rotation angle, $\beta$ is the actual rotation angle, A is a constant; and wherein the second predetermined angle difference is greater than the first predetermined angle difference.

5. The floor material recognition method of claim 1, wherein when the actual rotation angle is smaller than a second predetermined angle, or, when the absolute value of the difference between the actual rotation angle and the predetermined rotation angle is greater than a second predetermined angle difference, then $K=A \times \Delta 2$, wherein, $\Delta 2$ is the second predetermined angle difference, A is a constant; and wherein the second predetermined angle difference is greater than the first predetermined angle difference.

6. The floor material recognition method of claim 1, further comprising:

based on a determination that the floor material is the high-resistance material:

increasing a work power of the autonomous mobile device and/or setting a work mode as a high power mode;

shutting off a wet-mopping function or disabling start of the wet-mopping function, and raising a mopping plate; and/or controlling the autonomous mobile device to move backwardly and turn, until it is determined that the autonomous mobile device is no longer moving on a floor made of the high-resistance material.

7. A control method for controlling a moving velocity of an autonomous mobile device, comprising:

transmitting control instructions to the autonomous mobile device, the control instructions including com-mands that instruct the autonomous mobile device to rotate at a same location for a predetermined rotation angle;

obtaining an actual rotation angle of the autonomous mobile device;

comparing the actual rotation angle with the predeter-mined rotation angle;

when the actual rotation angle is smaller than the prede-termined rotation angle and an absolute value of a difference between the actual rotation angle and the predetermined rotation angle is greater than a first predetermined angle difference, configuring a set velocity of the autonomous mobile device as: $V_{set}=K \times V_{target}$, wherein, $V_{set}$ is the set velocity, $V_{target}$ is a target velocity, K is a coefficient, and K>1, wherein the target velocity is a moving velocity for the autonomous mobile device to reach when moving on a floor as required by the control instructions, wherein the set velocity is a velocity for a motion assembly of the autonomous mobile device to reach, as required by the control instructions, in order for the autonomous mobile device to reach the target velocity; and controlling the autonomous mobile device to move on the floor at the target velocity.

8. The control method of claim 7, wherein when the actual rotation angle is greater than a second predetermined angle, or, when the absolute value of the difference between the actual rotation angle and the predetermined rotation angle is greater than the first predetermined angle difference and smaller than a second predetermined angle difference, then, K=A×(α–β), wherein α is the predetermined rotation angle, β is the actual rotation angle, A is a constant; and the second predetermined angle difference is greater than the first predetermined angle difference.

9. The control method of claim 7, wherein when the actual rotation angle is smaller than a second predetermined angle, or, when the absolute value of the difference between the actual rotation angle and the predetermined rotation angle is greater than a second predetermined angle difference, then, K=A×Δ2, wherein, Δ2 is the second predetermined angle difference, A is a constant; and wherein the second predetermined angle difference is greater than the first predetermined angle difference.

10. The control method of claim 7, further comprising:

increasing a work power of the autonomous mobile device or setting a work mode as a high power mode.

11. A non-transitory computer-readable storage medium storing computer-executable program instructions, which when executed by a processor of an autonomous mobile device, cause the processor to perform a floor material recognition method, wherein the floor material recognition method comprises:

transmitting control instructions to the autonomous mobile device, the control instructions including commands instructing the autonomous mobile device to rotate at the same location for a predetermined rotation angle;

obtaining an actual rotation angle of the autonomous mobile device;

comparing the actual rotation angle with the predetermined rotation angle; and determining that a floor material is a high-resistance material:

when the actual rotation angle is smaller than the predetermined rotation angle and an absolute value of a difference between the actual rotation angle and the predetermined rotation angle is greater than a first predetermined angle difference; and based on a determination that the floor material is the high-resistance material, configuring a set velocity of the autonomous mobile device as: $V_{set}=K \times V_{target}$, wherein, $V_{set}$ is the set velocity, $V_{target}$ is a target velocity, K is a coefficient, and K>1, wherein the target velocity is a moving velocity for the autonomous mobile device to reach when moving on a floor as required by the control instructions, wherein the set velocity is a velocity for a motion assembly of the autonomous mobile device to reach, as required by the control instructions, in order for the autonomous mobile device to reach the target velocity.

12. The non-transitory computer-readable storage medium of claim 11, wherein the method further comprises:

determining that the floor material is a low-resistance material:

when the actual rotation angle is smaller than the predetermined rotation angle, and the absolute value of the difference between the actual rotation angle and the predetermined rotation angle is smaller than the first predetermined angle difference.

13. The non-transitory computer-readable storage medium of claim 12, wherein the method further comprises:

based on a determination that the floor material is the low-resistance material:

maintaining a work power of the autonomous mobile device and/or setting a work mode as a normal mode or a quiet mode; and/or starting or allowing start of a wet-mopping function.

14. The non-transitory computer-readable storage medium of claim 11, wherein when the actual rotation angle is greater than a second predetermined angle, or, when the absolute value of the difference between the actual rotation angle and the predetermined rotation angle is greater than the first predetermined angle difference and smaller than a second predetermined angle difference, then K=A×(α–β), wherein α is the predetermined rotation angle, β is the actual rotation angle, A is a constant; and wherein the second predetermined angle difference is greater than the first predetermined angle difference.

15. The non-transitory computer-readable storage medium of claim 11, wherein when the actual rotation angle is smaller than a second predetermined angle, or, when the absolute value of the difference between the actual rotation angle and the predetermined rotation angle is greater than a second predetermined angle difference, then K=A×Δ2, wherein, Δ2 is the second predetermined angle difference, A is a constant; and wherein the second predetermined angle difference is greater than the first predetermined angle difference.

16. The non-transitory computer-readable storage medium of claim 11, wherein the method further comprises:

based on a determination that the floor material is the high-resistance material:

increasing a work power of the autonomous mobile device and/or setting a work mode as a high power mode;

shutting off a wet-mopping function or disabling start of the wet-mopping function, and raising a mopping plate; and/or controlling the autonomous mobile device to move backwardly and turn, until it is determined that the autonomous mobile device is no longer moving on a floor made of the high-resistance material.

* * * * *